United States Patent
Takeuchi

(10) Patent No.: US 10,701,748 B2
(45) Date of Patent: *Jun. 30, 2020

(54) COMMUNICATION DEVICE AND NON-TRANSITORY COMPUTER-READABLE RECORDING MEDIUM STORING COMPUTER-READABLE INSTRUCTIONS FOR COMMUNICATION DEVICE

(71) Applicant: BROTHER KOGYO KABUSHIKI KAISHA, Nagoya-shi, Aichi (JP)

(72) Inventor: Shun Takeuchi, Kiyosu (JP)

(73) Assignee: Brother Kogyo Kabushiki Kaisha, Nagoya-shi, Aichi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/227,114

(22) Filed: Dec. 20, 2018

(65) Prior Publication Data

US 2019/0223238 A1    Jul. 18, 2019

(30) Foreign Application Priority Data

Jan. 12, 2018  (JP) .................. 2018-003730

(51) Int. Cl.
*H04W 76/14* (2018.01)
*H04W 4/80* (2018.01)
(Continued)

(52) U.S. Cl.
CPC .......... *H04W 76/14* (2018.02); *H04W 4/80* (2018.02); *H04W 74/06* (2013.01); *H04W 8/005* (2013.01); *H04W 92/18* (2013.01)

(58) Field of Classification Search
CPC ..................................................... H04W 4/80
See application file for complete search history.

(56) References Cited

U.S. PATENT DOCUMENTS

2004/0019717 A1 * 1/2004 Kondo ................. H04N 7/0125
710/100
2013/0260684 A1 * 10/2013 Suzuki .................... H04B 5/00
455/41.1
(Continued)

FOREIGN PATENT DOCUMENTS

JP     2013157736 A     8/2013
JP     2017182626 A     10/2017

OTHER PUBLICATIONS

Wi-Fi Alliance, "Wi-Fi Peer-to-Peer (P2P) Technical Specification version 1.1", Oct. 4, 2010 (Oct. 4, 2010), pp. 1-159, Retrieved from the Internet <URL:https://www.wi-fi.org/downloads-registered/Wi-Fi_P2P_Technical_Specification_v1.1.pdf> [retrieved on Dec. 20, 2018].

*Primary Examiner* — Hsinchun Liao
(74) *Attorney, Agent, or Firm* — Scully, Scott, Murphy & Presser, PC

(57) ABSTRACT

A communication device may include a wireless interface configured to repeat operating sequentially in a plurality of states including a first state and a second state. The communication device may acquire first information from the wireless interface in a case where the wireless interface operating in the first state sends the first polling signal to a first external device and receives a response signal to the first polling signal from the first external device, and supply a specific signal to the wireless interface in a case where the first information is acquired from the wireless interface, the specific signal being for causing the wireless interface to use, as a duration time period of the second state, a specific time period instead of the second predetermined time period, the specific time period being longer than the second predetermined time period.

26 Claims, 17 Drawing Sheets

(51) Int. Cl.
*H04W 74/06* (2009.01)
*H04W 92/18* (2009.01)
*H04W 8/00* (2009.01)

(56) References Cited

U.S. PATENT DOCUMENTS

| | | |
|---|---|---|
| 2014/0342665 A1 | 11/2014 | Amano |
| 2016/0192260 A1 | 6/2016 | Amano |
| 2016/0255238 A1* | 9/2016 | Saito ........................ H04W 4/80 358/1.13 |
| 2017/0265028 A1* | 9/2017 | Topalli .................. H04M 1/605 |
| 2018/0324664 A1 | 11/2018 | Amano |

* cited by examiner

FIG. 14

FIG. 17
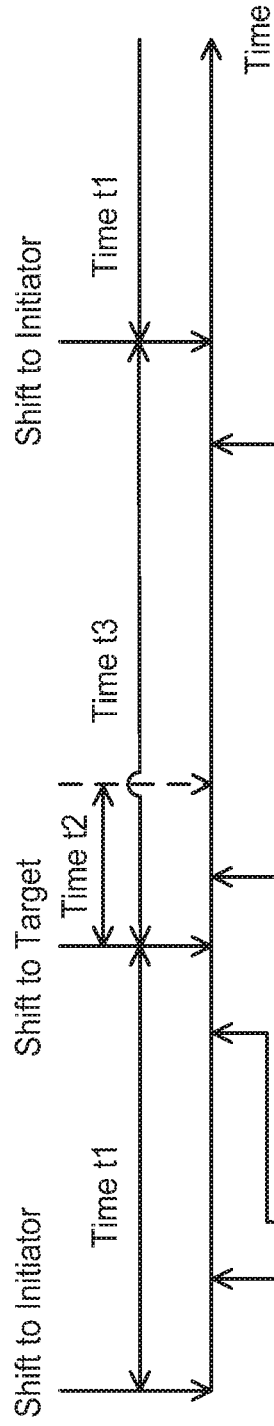
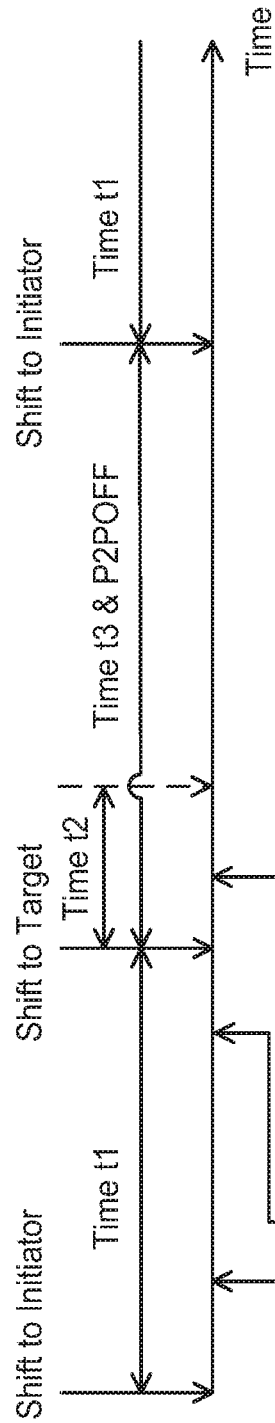

COMMUNICATION DEVICE AND NON-TRANSITORY COMPUTER-READABLE RECORDING MEDIUM STORING COMPUTER-READABLE INSTRUCTIONS FOR COMMUNICATION DEVICE

CROSS-REFERENCE TO RELATED APPLICATION

This application claims priority to Japanese Patent Application No. 2018-003730, filed on Jan. 12, 2018, the entire contents of which are hereby incorporated by reference into the present application.

TECHNICAL FIELD

The disclosure herein discloses a communication device provided with a wireless interface capable of establishing a wireless link with an external device.

BACKGROUND ART

A system provided with a printer and a digital camera is known. The printer acquires a list of operation modes in which the digital camera is capable of operating. In a case where the digital camera is capable of operating in a P2P (abbreviation of Peer To Peer) mode in an NFC (abbreviation of Near Field Communication) scheme, the printer causes the digital camera to operate in the P2P mode and sends communication parameters to the digital camera. On the other hand, in a case where the digital camera is not capable of operating in the P2P mode, the printer causes the digital camera to operate in a CE (abbreviation of Card Emulation) mode of the NFC scheme and sends the communication parameters to the digital camera.

SUMMARY

The disclosure herein provides a new technique for a wireless interface of a communication device to establish a suitable wireless link with an external device.

A communication device disclosed herein may comprise: a wireless interface configured to repeat operating sequentially in a plurality of states including a first state and a second state, the first state being a state where the wireless interface sends a first polling signal over a first predetermined time period, the first polling signal being for establishing a wireless link with an external device, the second state being a state where the wireless interface waits to receive a second polling signal over a second predetermined time period, the second polling signal being for establishing a wireless link with the communication device and being sent from an external device; a processor; and a memory storing computer-readable instructions therein. The computer-readable instructions, when executed by the processor, may cause the communication device to: acquire first information from the wireless interface in a case where the wireless interface operating in the first state sends the first polling signal to a first external device and receives a response signal to the first polling signal from the first external device; and supply a specific signal to the wireless interface in a case where the first information is acquired from the wireless interface, the specific signal being for causing the wireless interface to use, as a duration time period of the second state, a specific time period instead of the second predetermined time period, the specific time period being longer than the second predetermined time period.

A communication device disclosed herein may comprise: a wireless interface configured to execute a wireless communication according to a Near Field Communication (NFC) scheme; a processor; and a memory storing computer-readable instructions therein. The computer-readable instructions, when executed by the processor, may cause the communication device to: acquire first information from the wireless interface in a case where the wireless interface sends a first polling signal for establishing a wireless link with an external device to a first external device and receives a response signal to the first polling signal from the first external device under a state where at least a Peer to Peer (P2P) mode of the NFC scheme is enabled; and supply a specific signal to the wireless interface in a case where the first information is acquired from the wireless interface in which at least the P2P mode is enabled, the specific signal being for causing the wireless interface to achieve a state where the P2P mode is disabled and at least one mode of a Card Emulation (CE) mode and a Reader/Writer (R/W) mode of the NFC scheme is enabled.

A control method, a computer program, and a computer-readable recording medium that stores the computer program for realizing each of the above communication devices are also new and useful. Further, a communication system provided with at least one of the above communication devices and the first external device is also new and useful.

BRIEF DESCRIPTION OF THE DRAWINGS

FIG. 14 shows a diagram for explaining differences between a comparative embodiment and the embodiment.

FIG. 17 shows diagram for explaining differences between a comparative embodiment and the embodiment.

EMBODIMENTS

Figure 1:
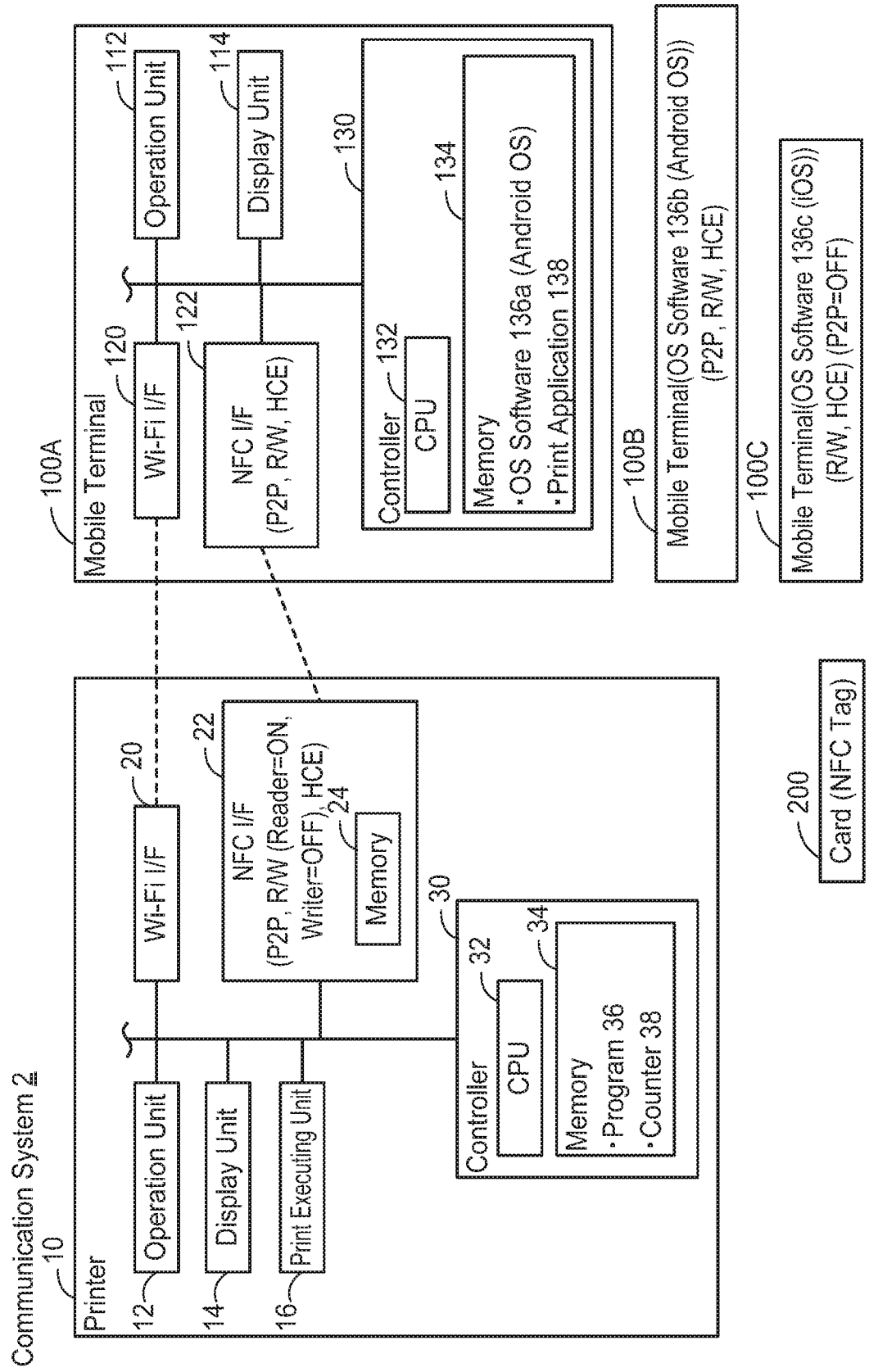
FIG. 1 shows a configuration of a communication system.

First Embodiment (Configuration of Communication System 2; FIG. 1)

As shown in FIG. 1, a communication system 2 includes a printer 10, a plurality of mobile terminals 100A to 100C, and a card 200. Each of the devices 10, 100A to 100C, 200 is capable of executing an NFC (abbreviation of Near Field Communication) communication being a wireless communication in an NFC scheme with each other.

(Configuration of Printer 10)

The printer 10 is a peripheral device capable of executing a printing function (that is, a peripheral device for the mobile terminal 100A, etc.), and includes an operation unit 12, a display unit 14, a print executing unit 16, a Wi-Fi interface (hereinbelow, an interface will be denoted "I/F") 20, an NFC I/F 22, and a controller 30.

The operation unit 12 includes a plurality of keys. A user can operate the operation unit 12 to input various instructions to the printer 10. The display unit 14 is a display for displaying various types of information. The display unit 14 also functions as a so-called touch panel (that is, the operation unit). The print executing unit 16 is a printing mechanism of an inkjet scheme or a laser scheme.

The Wi-Fi I/F 20 is an I/F for executing a Wi-Fi communication being a wireless communication in a Wi-Fi scheme. The Wi-Fi scheme is, for example, a wireless communication scheme based on an 802.11 standard of IEEE (abbreviation of the Institute of Electrical and Electronics Engineers, Inc.), and standards complying thereto (such as 802.11a, 11b, 11g, 11n, 11ac, etc.), for example. More specifically, the Wi-Fi I/F 20 supports a WFD (abbreviation of Wi-Fi Direct (registered trademark)) scheme established by the Wi-Fi Alliance. The WFD scheme is a wireless communication scheme described in the standard manual "Wi-Fi Peer-to-Peer (P2P) Technical Specification Version 1.1" drafted by the Wi-Fi Alliance.

The NFC I/F 22 includes a memory 24. The NFC I/F 22 is an I/F for executing an NFC communication. The NFC scheme is a wireless communication scheme based on the international standard ISO/IEC14443, 15693, 18092, for example. As types of I/F for executing the NFC communication, an I/F called an NFC forum device and an I/F called an NFC tag are known. The NFC forum device is an I/F capable of selectively operating in one of a P2P (abbreviation of Peer To Peer) mode, an R/W (abbreviation of Reader/Writer) mode, and an HCE (abbreviation of Host Card Emulation) mode. The NFC tag is not an I/F capable of selectively operating in one of these modes, and it functions as an IC (abbreviation of Integrated Circuit) tag in the NFC scheme. The NFC I/F 22 is an NFC forum device.

The P2P mode is a mode for executing a bidirectional communication between one NFC device operating in the P2P mode and another NFC device operating in the P2P mode. The R/W mode and the HCE mode are modes for executing a unidirectional communication between one NFC device operating in the R/W mode and another NFC device operating in the HCE mode. The HCE mode is a CE mode which requires a secure element. A Reader mode included in the R/W mode is a mode for reading data from the NFC device operating in the HCE mode (that is, receiving data therefrom). A Writer mode included in the R/W mode is a mode for writing data in the NFC device operating in the HCE mode (that is, sending data thereto). The NFC device operating in the R/W mode can read data from the NFC tag and write data in the NFC tag. The NFC I/F 22 is capable of operating in the Reader mode included in the R/W mode (that is, it enables the Reader mode) but is not capable of operating in the Writer mode (that is, it disables the Writer mode). When information is written in the NFC device being a communication counterpart, there is a possibility that this NFC device may execute an unintended operation and a problem may arise, so the NFC I/F 22 has the Writer mode disabled from a viewpoint of security.

The NFC I/F 22 operates in an Initiator state or in a Target state. The Initiator state is a state in which a polling signal for establishing an NFC link with an external device is sent repeatedly. The Target state is a state in which it waits to receive a polling signal sent from the external device.

In a case where the NFC I/F 22 operates in the Initiator state to send a polling signal and it receives a response signal to this polling signal from the external device operating in the Target state, an NFC link with this external device is established. The NFC link established at this occasion is a P2P link or a R/W-CE link. The P2P link is an NFC link in which both the NFC I/F 22 and the external device operate in the P2P mode. The R/W-CE link is an NFC link in which the NFC I/F 22 operates in the R/W mode and the external device operates in the HCE mode.

Further, in a case where the NFC I/F 22 receives a polling signal from the external device operating in the Initiator state while the NFC I/F 22 is operating in the Target state, it sends a response signal to this polling signal to the external device and establishes the NFC link with this external device. The NFC link established at this occasion is a P2P link or a CE-R/W link. The CE-R/W link is an NFC link in which the NFC I/F 22 operates in the HCE mode and the external device operates in the R/W mode.

The NFC I/F 22 shifts from the Initiator state to the Target state after having operated in the Initiator state over a predetermined Initiator time period (hereinbelow termed "IN time period"). Further, the NFC I/F 22 shifts from the Target state to the Initiator state after having operated in the Target state over a predetermined Target time period (hereinbelow termed "TA time period"). That is, the NFC I/F 22 repeats operating sequentially in the Target state and in the Initiator state. As the IN time period and the TA time period for the NFC I/F 22, respectively, a time period t1 and a time period t2 are preset.

Next, a difference between the Wi-Fi I/F 20 and the NFC I/F 22 will be described. A communication speed of a Wi-Fi communication using the Wi-Fi I/F 20 (such as its maximum communication speed of 11 Mbps to 6.9 Gbps) is faster than a communication speed of the NFC communication using the NFC I/F 22 (such as its maximum communication speed of 100 to 424 Kbps). Further, a frequency of carrier waves in the Wi-Fi communication using the Wi-Fi I/F 20 (such as a 2.4 GHz range and a 5.0 GHz range) is different from a frequency of carrier waves in the NFC communication using the NFC I/F 22 (such as 13.56 MHz range). Further, a maximum distance by which the Wi-Fi communication using the Wi-Fi I/F 20 can be executed (such as about 100 m at maximum) is greater than a maximum distance by which the NFC communication using the NFC I/F 22 can be executed (such as about 10 cm at maximum).

The controller 30 is provided with a CPU 32 and a memory 34. The CPU 32 executes various processes according to a program 36 stored in the memory 34. The memory 34 is constituted of a volatile memory, a non-volatile memory and the like. The memory 34 stores a counter 38. The counter 38 is a counter for counting a number of times a R/W-CE link has been established between the NFC I/F 22 and its communication counterpart. As an initial value of the counter 38, "0" is set.

(Configurations of Mobile Terminals 100A to 100C)

The mobile terminal 100A is a portable terminal device such as a cell phone, a smartphone, a PDA, a portable music player, and a portable video player. The mobile terminal 100A includes an operation unit 112, a display unit 114, a Wi-Fi I/F 120, an NFC I/F 122, and a controller 130.

The operation unit 112 includes a plurality of keys. A user can operate the operation unit 112 to input various instructions to the mobile terminal 100A. The display unit 114 is a display for displaying various types of information. The display unit 114 functions as a so-called touch panel (that is, the operation unit). The Wi-Fi I/F 120 is similar to the Wi-Fi I/F 20 of the printer 10. The NFC I/F 122 is similar to the NFC I/F 22 of the printer 10 except that it is capable of operating in both the Reader mode and the Writer mode in the R/W mode.

The controller 130 includes a CPU 132 and a memory 134. The CPU 132 executes various processes according to OS (abbreviation of Operating System) software 136a stored in the memory 134. The OS software 136a is software for controlling various basic operations of the mobile terminal 100A. In the present embodiment, a situation is assumed in which the OS software 136a is an Android (registered trademark) OS. Further, the memory 134 stores a print application 138. The print application 138 is an application provided by a vendor of the printer 10, and is installed in the mobile terminal 100A, for example, from a server on the Internet. The print application 138 is an application for causing a Wi-Fi connection to be established between the mobile terminal 100A and the printer 10 and sending print data representing a print target image to the printer 10 using this Wi-Fi connection.

The mobile terminal 100B has a similar configuration to that of the mobile terminal 100A. In the present embodiment, a situation is assumed in which OS software 136b of the mobile terminal 100B is an Android OS. However, a situation is assumed in which a vendor of the mobile terminal 100B is different from a vendor of the mobile terminal 100A.

The mobile terminal 100C has a similar configuration to that of the mobile terminal 100A except that its NFC I/F (not shown) is incapable of operating in the P2P mode (i.e., the P2P mode is disabled therein). In the present embodiment, a situation is assumed in which OS software 136c of the mobile terminal 100C is an iOS (registered trademark) OS.

(Configuration of Card 200)

The card 200 is a card owned, for example, by a user of the printer 10. The card 200 includes an NFC I/F being an NFC tag. For example, the user causes, for example, a PC that is not shown to execute sending of print data to the printer 10. In so doing, the print data is associated with a user ID which identifies this user. After this, when the user brings the card 200 close to the printer 10, an NFC link is established between the printer 10 and the card 200, and the user ID as aforementioned which is stored in advance in the card 200 is sent to the printer 10. In this case, the printer 10 determines that authentication of the user ID has succeeded, and executes printing according to the aforementioned print data. That is, the card 200 is an authentication card for authenticating the user ID.

(Processes Executed by Respective Devices 10, etc.; FIGS. 2 to 14)

Processes executed by the respective devices 10, etc. will be described with reference to FIGS. 2 to 14. In each sequence diagram (such as FIG. 2), arrows with narrow lines indicate NFC communications via an NFC I/F (such as 22), and arrows with bold lines indicate Wi-Fi communications via a Wi-Fi I/F (such as 20). Further, in an initial state of each drawing, the printer 10 is operating in a Group Owner (hereinbelow termed "G/O") state of the WFD scheme. When the printer 10 shifts to the G/O state, the controller 30 of the printer 10 generates wireless setting information that is to be used in a wireless network in which the printer 10 operates as a G/O and stores it in the memory 24 of the NFC I/F 22. Due to this, the memory 24 already stores the wireless setting information. Further, in the initial state of each drawing, all of the P2P mode, the R/W mode, and the HCE mode in the NFC I/F 22 of the printer 10 are enabled (that is, set as ON). However, the Writer mode in the R/W mode is disabled (that is, set as OFF).

Figure 2:
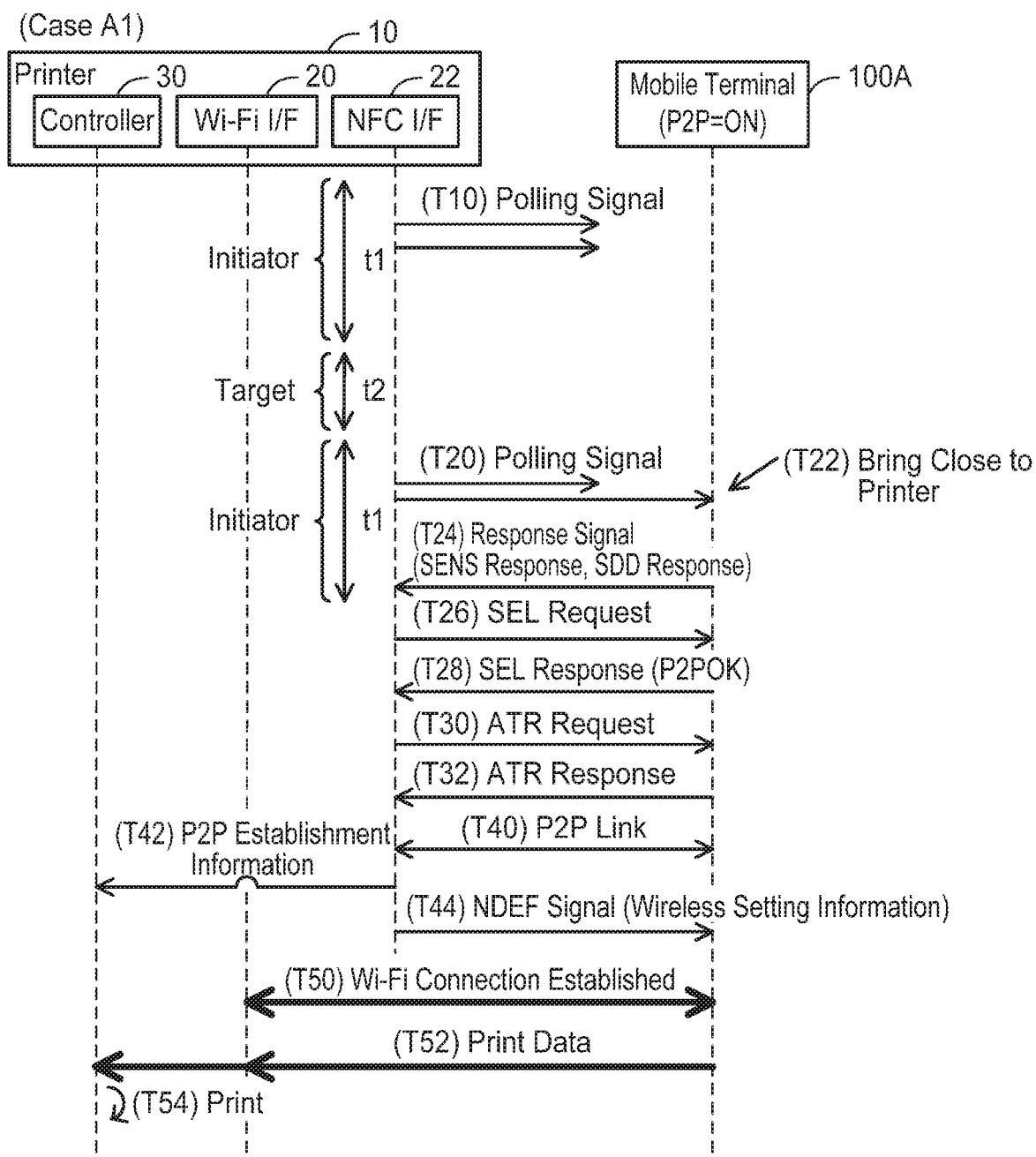
FIG. 2 shows a sequence diagram of Case A1 in which a P2P link is established between a printer in an Initiator state and a mobile terminal.

(Case A1; FIG. 2)

In Case A1, a P2P link is established between the printer 10 that operates in the Initiator state and the mobile terminal 100A provided with the Android OS 136a. In the initial state of Case A1, all of the P2P mode, the R/W mode, and the HCE mode of the NFC I/F 122 of the mobile terminal 100A are ON.

The NFC I/F 22 of the printer 10 repeats operating sequentially in the Initiator state and in the Target state. Specifically, in T10, the NFC I/F 22 operates in the Initiator state and sends a polling signal. When the NFC I/F 22 operates in the Initiator state over the time period t1 (i.e., the IN time period) without receiving any response signal to the polling signal from the external device, it shifts from the Initiator state to the Target state. Further, when the NFC I/F 22 operates in the Target state over the time period t2 (i.e., the TA time period) without receiving any polling signal from the external device, it shifts from the Target state to the Initiator state, and restarts to send the polling signal in T20.

When a user activates the print application 138 in the mobile terminal 100A and brings the mobile terminal 100A close to the printer 10 in T22, the NFC I/F 122 of the mobile terminal 100A receives a polling signal from the printer 10, and sends a response signal to the printer 10 in T24. The response signal includes a SENS response and an SDD response, where the SDD response includes an ID of the mobile terminal 100A, and the SENS response includes information indicating that a data size of the ID is 4 bytes. In a case where a source that had sent the response signal as above is the card 200, the SENS response includes information indicating that the data size of the ID of the card 200 is 7 bytes.

When the response signal is received from the mobile terminal 100A in T24, the NFC I/F 22 of the printer 10 sends a SEL request to the mobile terminal 100A in T26.

When the SEL request is received from the printer 10 in T26, the NFC I/F 122 of the mobile terminal 100A sends a SEL response including information "P2POK", which indicates that the P2P mode is ON, to the printer 10 in T28.

When the NFC I/F 22 of the printer 10 receives the SEL response from the mobile terminal 100A in T28, it sends an ATR request for requesting to establish a P2P link to the mobile terminal 100A in T30 since the SEL response received in T28 incudes the information "P2POK", and then it receives an ATR response from the mobile terminal 100A in T32. As a result, in T40, a P2P link is established between the NFC I/F 22 of the printer 10 and the NFC I/F 122 of the mobile terminal 100A. Further, in T42, the NFC I/F 22 supplies the controller 30 with P2P establishment information indicating that the P2P link has been established.

In T44, the NFC I/F 22 of the printer 10 sends an NDEF (abbreviation of NFC Data Exchange Format) signal including the wireless setting information stored in the memory 24 to the mobile terminal 100A by using the P2P link. Next, a communication using the wireless setting information is executed between the Wi-Fi I/F 20 of the printer 10 and the Wi-Fi I/F 120 of the mobile terminal 100A, and a Wi-Fi connection is established between the Wi-Fi I/F 20 and the Wi-Fi I/F 120 in T50.

The controller 30 of the printer 10 uses the Wi-Fi connection, in T52, to receive print data representing a print target image from the mobile terminal 100A via the Wi-Fi I/F 20. Then, the controller 30 supplies the print data to the print executing unit 16 in T54 and causes the print executing unit 16 to execute printing of the image represented by the print data.

As aforementioned, in the present embodiment, the Wi-Fi connection is established after the NFC link has been established between the printer 10 and the mobile terminal 100A, and the print data is communicated by using the Wi-Fi connection. The communication speed of the Wi-Fi communication is faster than the communication speed of the NFC communication. Due to this, as compared to a case where the print data is communicated by using the NFC communication, the print data can be communicated at high speed. Further, the user simply needs to bring the mobile terminal 100A close to the printer 10 to establish the Wi-Fi connection between the printer 10 and the mobile terminal 100A. Thus, the user can easily cause the Wi-Fi connection to be established.

Figure 3:
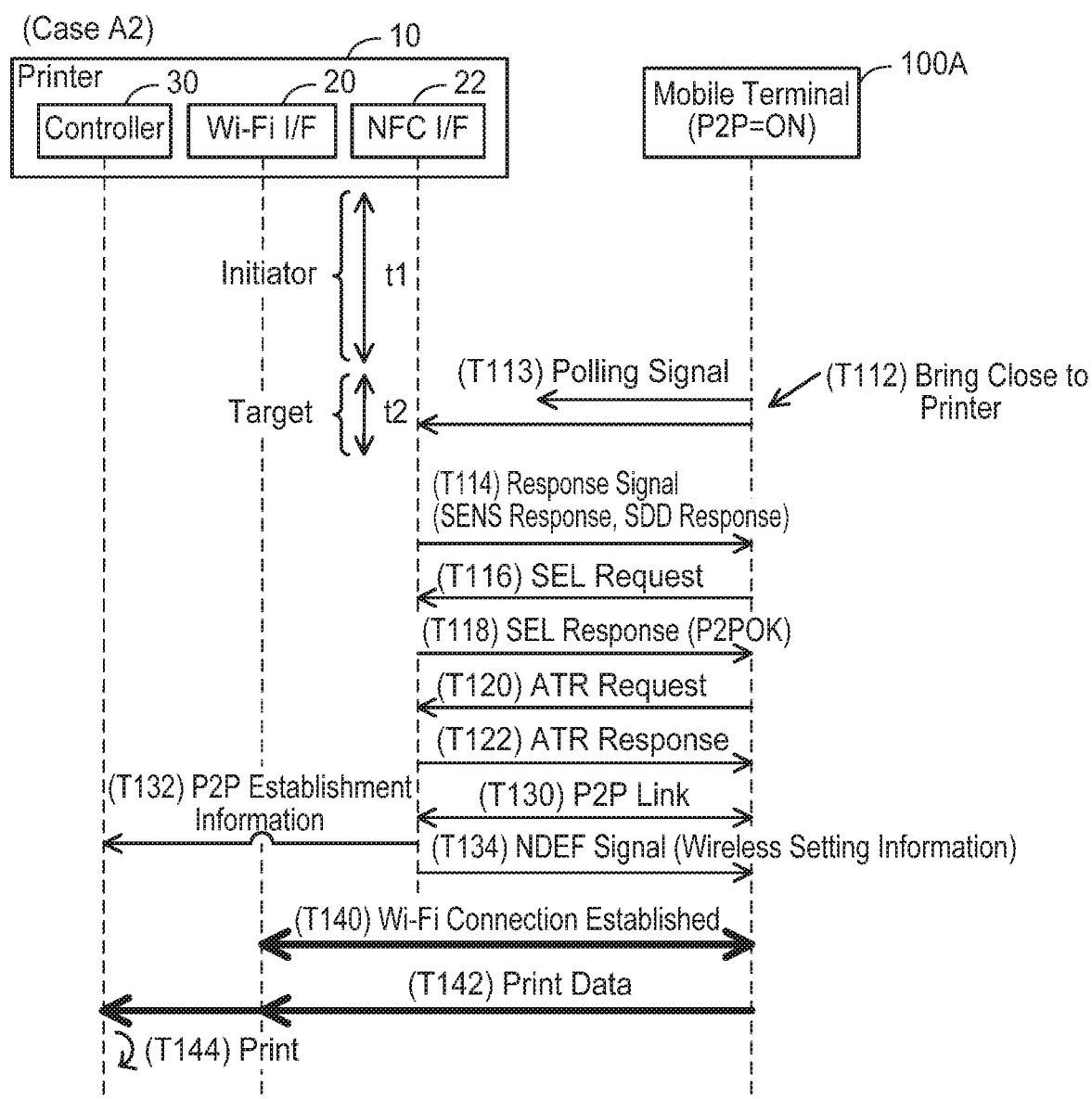
FIG. 3 shows a sequence diagram of Case A2 in which a P2P link is established between the printer in a Target state and the mobile terminal.

(Case A2; FIG. 3)

Next, Case A2 in which a P2P link is established between the printer 10 operating in the Target state and the mobile terminal 100A will be described with reference to FIG. 3. The initial state of Case A2 is similar to the initial state of Case A1 of FIG. 2.

When the user brings the mobile terminal 100A close to the printer 10 in T112, the NFC I/F 22 of the printer 10 operating in the Target state receives a polling signal from the mobile terminal 100A in T113.

When the NFC I/F 22 of the printer 10 receives the polling signal from the mobile terminal 100A in T113, it sends a response signal including a SENS response and an SDD response to the mobile terminal 100A in T114, and receives a SEL request from the mobile terminal 100A in T116. Since the P2P mode in the NFC I/F 22 is ON, the NFC I/F 22 sends a SEL response including the information "P2POK" to the mobile terminal 100A in T118. Then, the NFC I/F 22 receives an ATR request from the mobile terminal 100A in T120, and sends an ATR response to the mobile terminal 100A in T122. T130 to T144 which take place thereafter are similar to T40 to T54 of FIG. 2.

As shown in Case A1 of FIG. 2 and Case A2 of FIG. 3, the printer 10 can establish the P2P link with the mobile terminal 100A and establish the Wi-Fi connection with the mobile terminal 100A in either case where the NFC I/F 22 communicates the polling signal with the mobile terminal 100A in the Initiator state or in the Target state.

Figure 4:
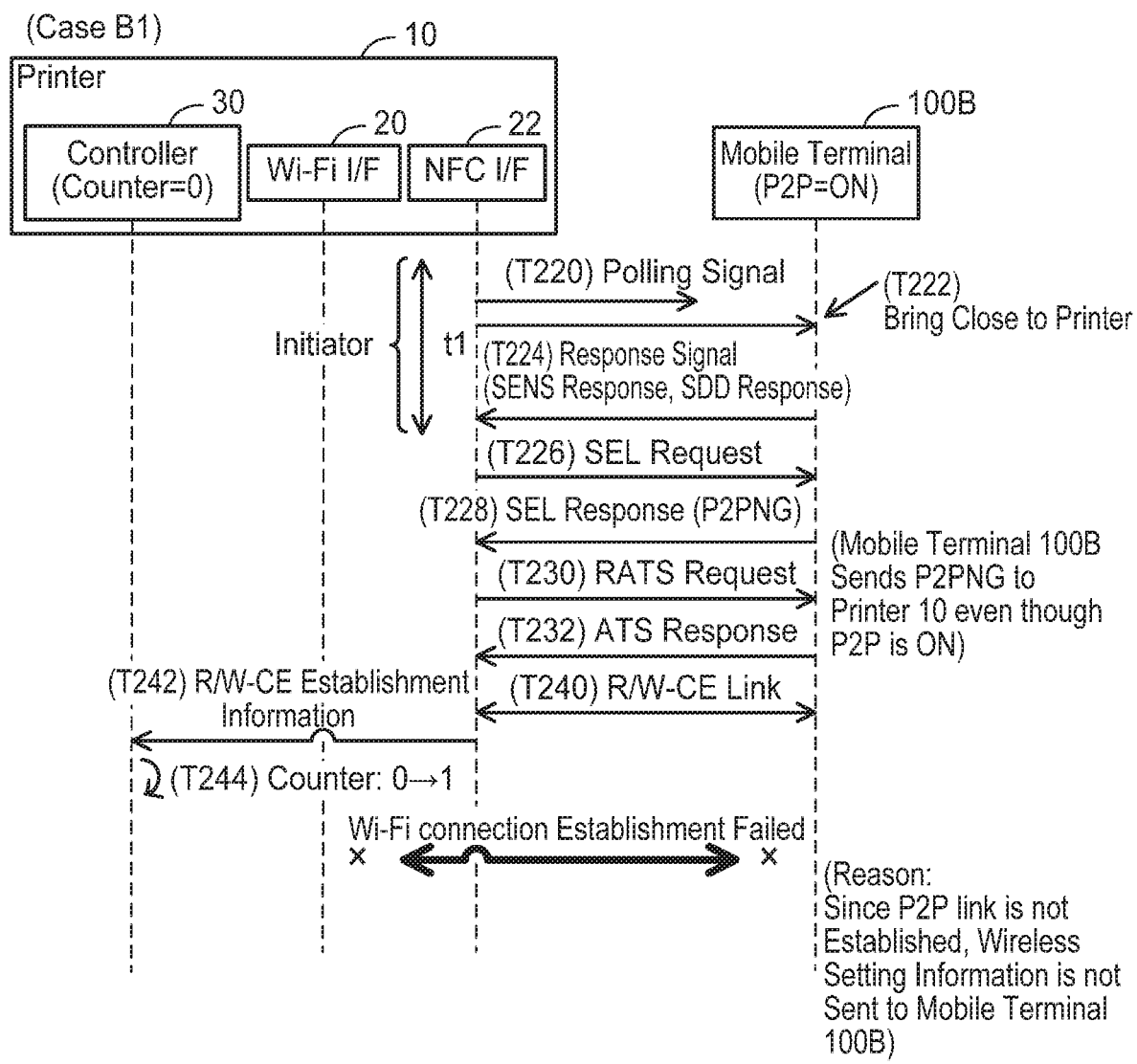
FIG. 4 shows a sequence diagram of Case B1 in which a R/W-CE link is established between the printer in the Initiator state and the mobile terminal.

(Case B1; FIG. 4)

Next, Case B1 will be described with reference to FIG. 4. In Case B1, a R/W-CE link is established between the printer 10 operating in the Initiator state and the mobile terminal 100B provided with the Android OS 136b. In the initial state of FIG. 4, all of the P2P mode, the R/W mode, and the HCE mode of the NFC I/F (not shown) of the mobile terminal 100B are ON.

T220 to T226 are similar to T20 to T26 of FIG. 2 except that the mobile terminal 100B is the communication counterpart. When receiving a SEL request from the printer 10 in T226, the NFC I/F of the mobile terminal 100B sends a SEL response including information "P2PNG" indicating that the P2P mode is OFF to the printer 10 in T228, although the P2P mode is actually ON therein. The NFC I/F of the mobile terminal 100B sending the SEL response including the information "P2PNG" in T228 is likely due to a malfunction of the mobile terminal 100B.

When the NFC I/F 22 of the printer 10 receives the SEL response from the mobile terminal 100B in T228, since the SEL response includes the information "P2PNG", it sends a RATS request for requesting to establish a R/W-CE link to the mobile terminal 100B in T230, and receives an ATS response from the mobile terminal 100B in T232. As a result, a R/W-CE link is established between the NFC I/F 22 of the printer 10 and the NFC I/F of the mobile terminal 100B in T240.

Since the response signal received in T224 includes the information that the data size of the ID is 4 bytes, the NFC I/F 22 of the printer 10 determines that its communication counterpart is a mobile terminal, and supplies the controller 30 in T242 with R/W-CE establishment information that includes information indicating that a R/W-CE link has been established with the communication counterpart being a mobile terminal. Then, when the R/W-CE establishment information is acquired from the NFC I/F 22 in T242, the controller 30 increments the value of the counter 38 by "1" in T244. A timing when the NFC I/F 22 supplies the R/W-CE establishment information to the controller 30 may be immediately after having received the ATS response from the mobile terminal 100B in T232.

In the present embodiment, the NFC I/F 22 is configured to execute communication with a card using a R/W-Card link in a case where the R/W-Card link with the card is established, however, it is configured not to execute communication with a mobile terminal using a R/W-CE link in a case where the R/W-CE link with the mobile terminal is established. Due to this, the NFC I/F 22 disconnects the R/W-CE link when a time period that had elapsed since the R/W-CE link with the mobile terminal 100B was established exceeds a predetermined time period, without executing communication with the mobile terminal 100B by using the R/W-CE link. As a result, the wireless setting information cannot be sent to the mobile terminal 100B. Thus, in the present case, no Wi-Fi connection is established between the printer 10 and the mobile terminal 100B.

In a variant, the NFC I/F 22 of the printer 10 may be configured to execute communication with a mobile terminal by using a R/W-CE link even in the event where the communication counterpart is a mobile terminal. In this variant, the NFC I/F 22 sends a Read signal for reading data from the mobile terminal 100B to the mobile terminal 100B and receives SMP information from the mobile terminal 100B by using the R/W-CE link established in T240. Here, the SMP information includes a terminal ID used for authenticating the mobile terminal 100B, for example. Since the NFC I/F 22 can operate only in the Reader mode, it can receive the SMP information from the mobile terminal 100B, however, it cannot send the wireless setting information to the mobile terminal 100B. Thus, in this variant as well, no Wi-Fi connection is established between the printer 10 and the mobile terminal 100B.

Figure 5:
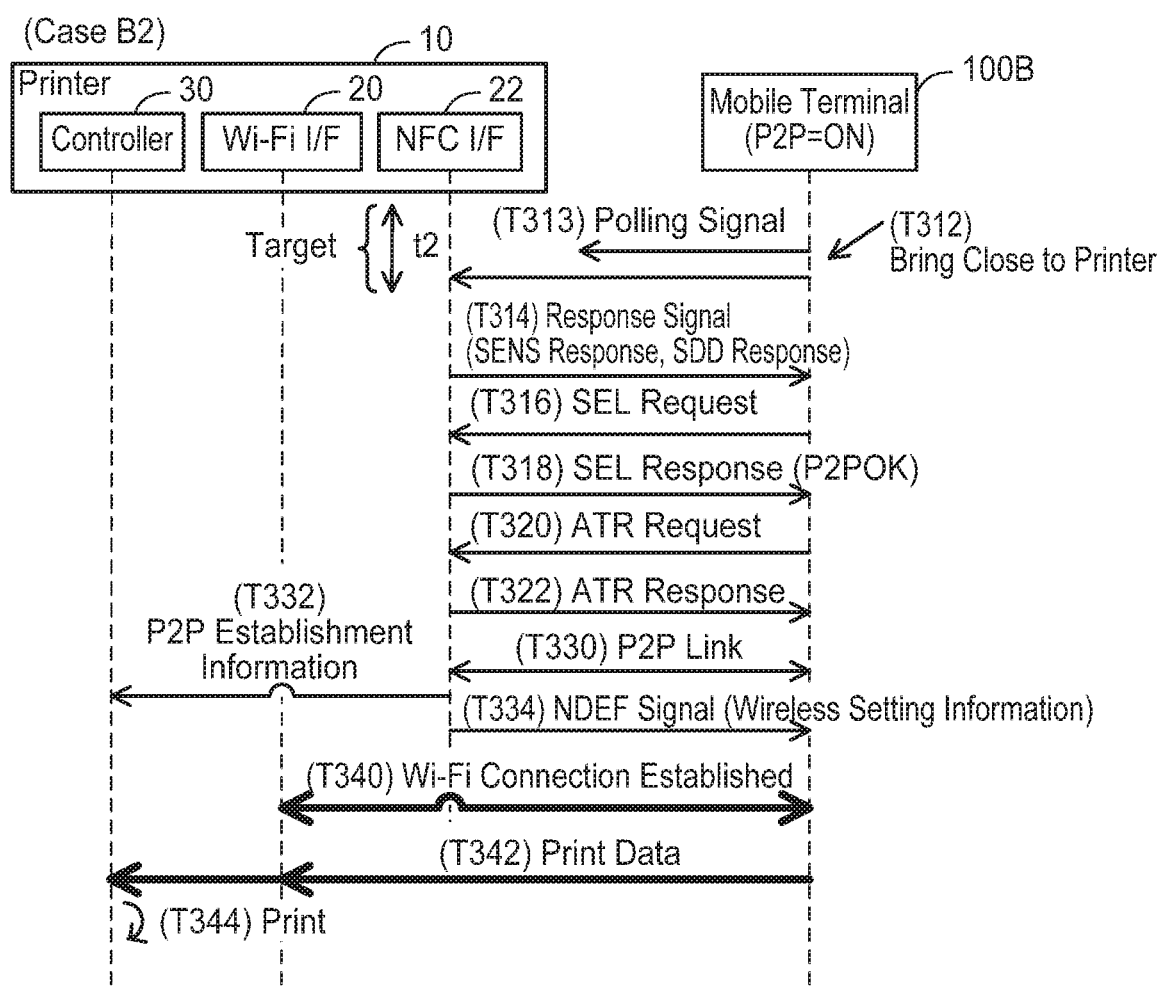
FIG. 5 shows a sequence diagram of Case B2 in which a P2P link is established between the printer in the Target state and the mobile terminal.

(Case B2; FIG. 5)

Next, Case B2 in which a P2P link is established between the printer 10 operating in the Target state and the mobile terminal 100B will be described with reference to FIG. 5. All of processes T312 to T344 shown in Case B2 are similar to T112 to T144 of FIG. 3 except that the mobile terminal 100B is the communication counterpart.

As shown in Case B1 of FIG. 4, in the case where the NFC I/F 22 in the Initiator state executes the communication of the polling signal with the mobile terminal 100B, the printer 10 establishes the R/W-CE link with the mobile terminal 100B, however, it cannot send the wireless setting information to the mobile terminal 100B by using the R/W-CE link. Due to this, the printer 10 cannot establish a Wi-Fi connection with the mobile terminal 100B. On the other hand, as shown in Case B2 of FIG. 5, in the case where the NFC I/F 22 in the Target state executes the communication of the polling signal with the mobile terminal 100B, the printer 10 can establish a P2P link with the mobile terminal 100B and send the wireless setting information to the mobile terminal 100B by using the P2P link. Due to this, the printer 10 can establish a Wi-Fi connection with the mobile terminal 100B. That is, the P2P link established between the printer 10 and the mobile terminal 100B can be said as being a suitable NFC link for establishing the Wi-Fi connection between the printer 10 and the mobile terminal 100B.

Figure 6:
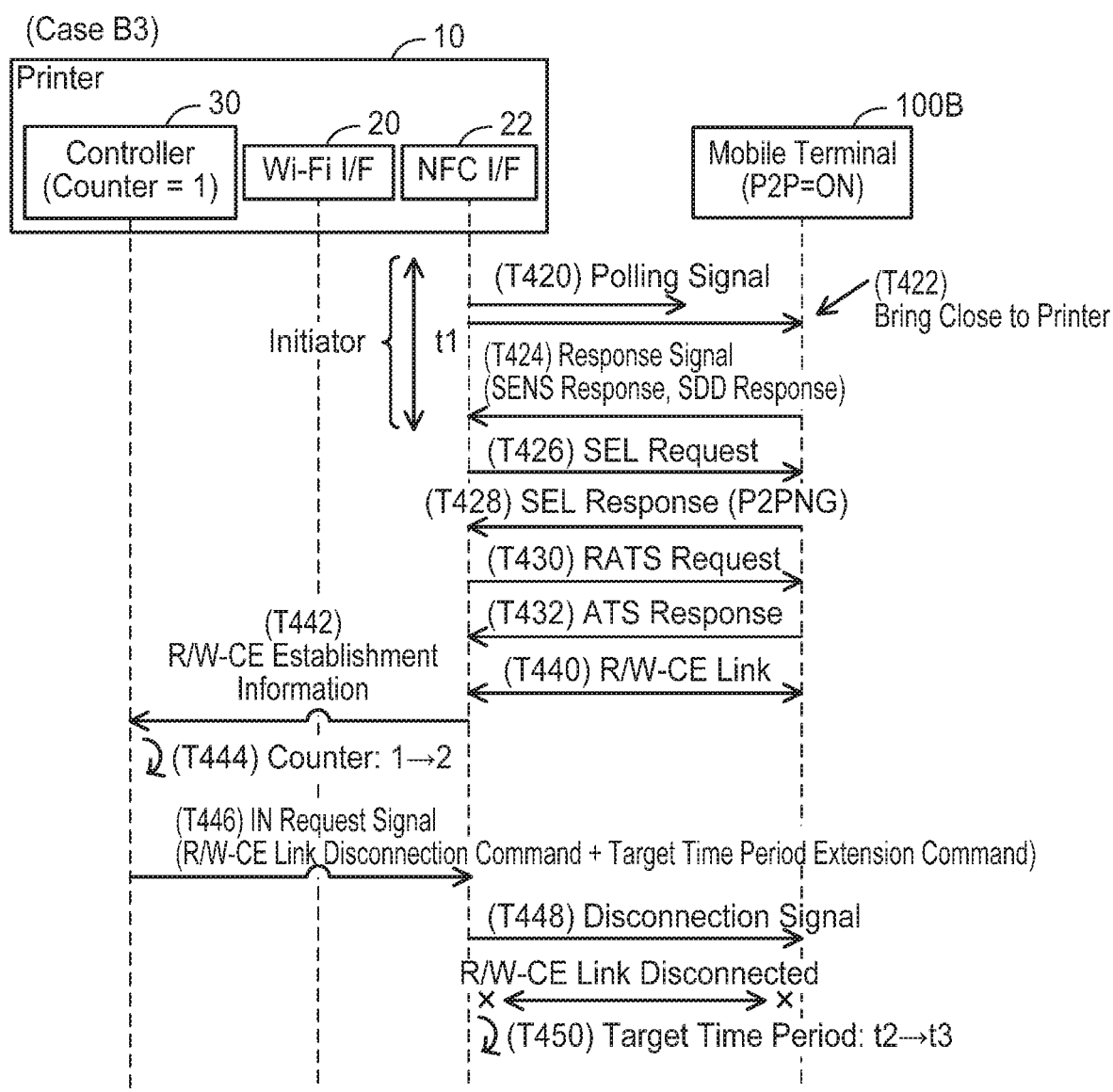
FIG. 6 shows a sequence diagram of Case B3 in which a Target time period is extended.

(Case B3; FIG. 6)

Next, Case B3 which is a continuation of Case B1 of FIG. 4, that is, Case B3 where "1" is stored in the counter 38 will be described with reference to FIG. 6.

T420 to T442 are similar to T220 to T242 of FIG. 4. When the controller 30 of the printer 10 acquires the R/W-CE establishment information from the NFC I/F 22 in T442, it increments the value of the counter 38 by "1" in T444. In this case, the controller 30 determines that the value of the counter 38 has reached a preset threshold value "2", and supplies the NFC I/F 22 with an IN request signal including a R/W-CE link disconnection command and a Target time period extension command in T446. The R/W-CE link disconnection command is a command requesting the NFC I/F 22 to disconnect the R/W-CE link that was established in T440. Further, the Target time period extension command is a command requesting the NFC I/F 22 to change the TA time period immediately after the acquisition of the IN request signal to a time period t3 which is longer than the time period t2. The controller 30 does not supply the IN request signal to the NFC I/F 22 in a state where the value of the counter 38 is less than "2" as shown in T244 of Case B1 of FIG. 4. In a variant, "1" may be set as the above threshold, or a value that is "3" or more may be set.

When the NFC I/F 22 of the printer 10 receives the IN request signal from the controller 30 in T446, it sends a disconnection signal to the mobile terminal 100B in T448 in accordance with the R/W-CE link disconnection command included in the IN request signal. As a result, the R/W-CE link that was established in T440 is disconnected. Further, the NFC I/F 22 changes the TA time period from the time period t2 to the time period t3 in T450 in accordance with the Target time period extension command included in the IN request signal. After this, when the time period t1 elapses, the NFC I/F 22 shifts to the Target state that uses the time period t3 as the TA time period.

Figure 7:
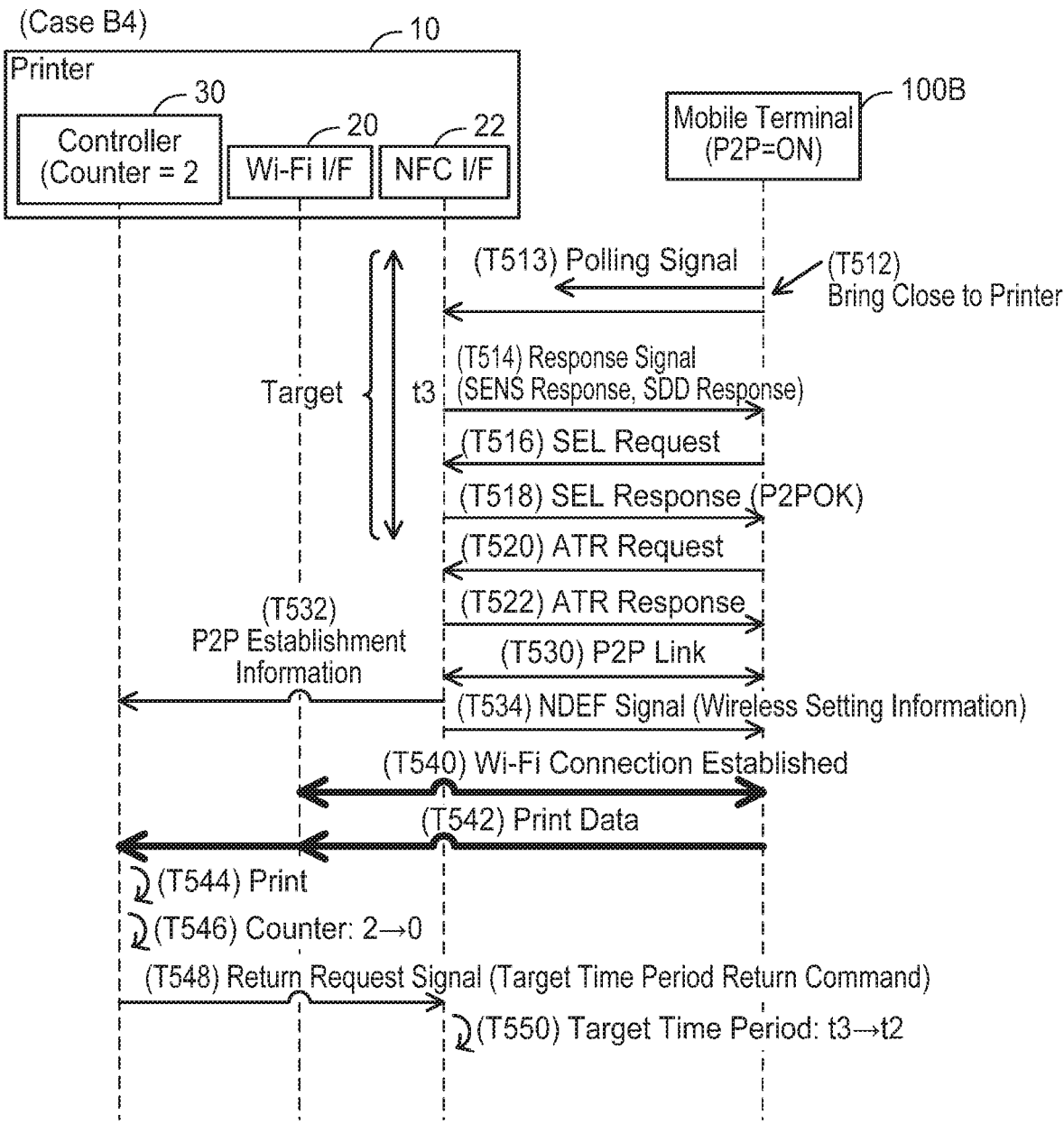
FIG. 7 shows a sequence diagram of Case B4, which is a continuation of Case B3.

(Case B4; FIG. 7)

Next, Case B4 which is a continuation of Case B3 of FIG. 6, that is, Case B4 after the TA time period has been changed to the time period t3, will be described with reference to FIG. 7.

T512 to T544 are similar to T312 to T344 of FIG. 5 except that the TA time period is the time period t3. That is, the P2P link, which is a suitable NFC link, is established between the printer 10 and the mobile terminal 100B (T530), the communication of the wireless setting information is executed (T534), the Wi-Fi connection is established (T540), and the communication of the print data is executed (T542).

When printing of the image is completed in T544, the controller 30 of the printer 10 changes the value of the counter 38 to the initial value (that is, "0") in T546. A timing when the controller 30 changes the value of the counter 38 to the initial value may be a timing immediately after the acquisition of the P2P establishment information from the NFC I/F 22 in T532, or may be a timing when the Wi-Fi connection is established in T540.

The controller 30 of the printer 10 supplies the NFC I/F 22 with a return request signal including a Target time period return command in T548. The Target time period return command is a command requesting the NFC I/F 22 to return the TA time period from the time period t3 to the time period t2. When the return request signal is acquired from the controller 30 in T548, the NFC I/F 22 changes the TA time period from the time period t3 to the time period t2 in T550 in accordance with the Target time period return command included in the return request signal.

(Effects of Cases B1 to B4)

Figure 8:
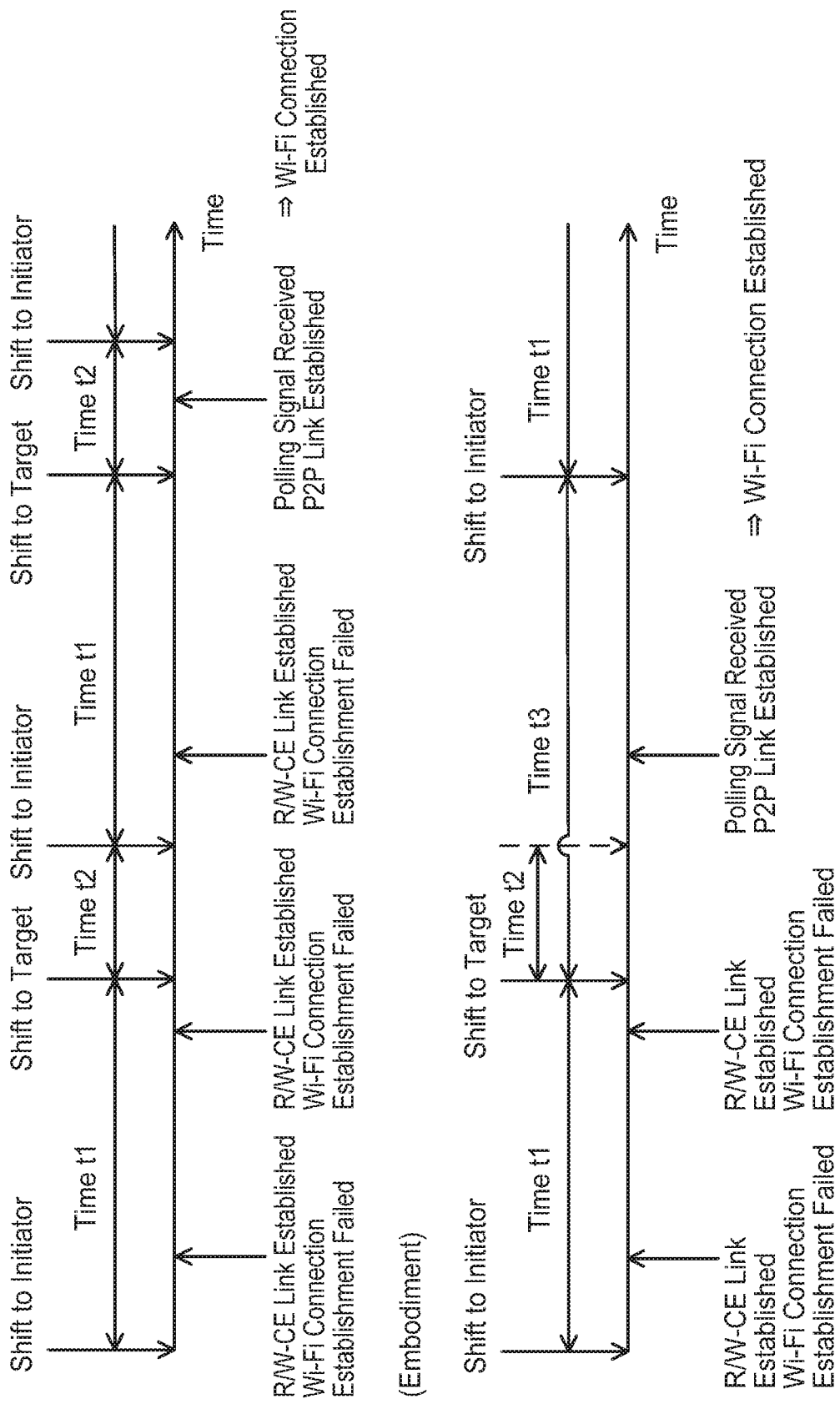
FIG. 8 shows a diagram for explaining differences between a comparative embodiment and an embodiment.

Effects of Cases B1 to B4 of the present embodiment will be described with reference to FIG. 8. Firstly, an operation of a printer of a comparative embodiment will be described. The printer of the comparative embodiment is provided with a similar configuration to that of the printer 10 except that it does not change the TA time period from the time period t2 to the time period t3. That is, in a case of sending a polling signal to the mobile terminal 100B while operating in the Initiator state, the printer cannot establish a P2P link with the mobile terminal 100B, and thus establishes a R/W-CE link with the mobile terminal 100B. As such, the printer cannot establish a Wi-Fi connection with the mobile terminal 100B. The printer cannot establish a P2P link with the mobile terminal 100B even when a polling signal is sent again to the mobile terminal 100B, and establishes a R/W-CE link with the mobile terminal 100B. In this case as well, the printer cannot establish a Wi-Fi connection with the mobile terminal 100B. Then, the printer shifts to the Target state when the time period t1 elapses.

When the time period t2 elapses without receiving a polling signal from the mobile terminal 100B, the printer shifts to the Initiator state. The printer cannot establish a P2P link with the mobile terminal 100B even sending a polling signal to the mobile terminal 100B while operating in the Initiator state, and thus it cannot establish a Wi-Fi connection with the mobile terminal 100B. After this, the printer shifts to the Target state when the time period t1 elapses, and establishes a P2P link with the mobile terminal 100B in a case of receiving a polling signal from the mobile terminal 100B while operating in the Target state. As a result, the printer can establish a Wi-Fi connection with the mobile terminal 100B.

As above, since the printer of the comparative embodiments uses only the time period t2 as the TA time period, a duration during which it is operating in the Target state is short, and thus likelihood of receiving a polling signal from the mobile terminal 100B is low. As a result, a long time period might be required to establish a Wi-Fi connection between the mobile terminal 100B and the printer after the user has brought the mobile terminal 100B close to the printer.

Next, an operation of the printer 10 of the embodiment will be described. When the printer 10 sends a polling signal to the mobile terminal 100B while operating in the Initiator state, it establishes a R/W-CE link with the mobile terminal 100B (T240 of FIG. 4), and changes the value of the counter 38 from "0" to "1" (T244). In this case, the printer 10 does not establish a Wi-Fi connection with the mobile terminal 100B. Then, when the printer 10 sends a polling signal to the mobile terminal 100B again while operating in the Initiator state, it establishes a R/W-CE link with the mobile terminal 100B (T440 of FIG. 6), changes the value of the counter 38 from "1" to "2" (T444), and changes the TA time period from the time period t2 to the time period t3 (T450).

After this, when the time period t1 elapses, the printer 10 shifts to the Target state using the time period t3 as the TA time period. Since the TA time period is extended to the time period t3, the printer 10 does not shift to the Initiator state even when the time period t2 elapses and maintains in the Target state. Due to this, the printer 10 can receive a polling signal from the mobile terminal 100B (T513 of FIG. 7) while operating in the Target state, and can establish a P2P link with the mobile terminal 100B (T530). Due to this, the printer 10 can establish a Wi-Fi connection with the mobile terminal 100B (T540).

As above, the printer 10 of the present embodiment uses the time period t3 instead of the time period t2 as the TA time period when the number of times the R/W-CE link has been established with the mobile terminal 100B becomes two. Due to this, a time period during which the printer 10 is operating in the Target state is extended, so the likelihood of receiving a polling signal from the mobile terminal 100B can be increased as compared to the printer of the comparative embodiment. As a result, the printer 10 can establish a P2P link that is a suitable NFC link (that is, an NFC link by which the wireless setting information can be sent) with the mobile terminal 100B, and especially, the time period since the user brings the mobile terminal 100B close to the printer 10 until a Wi-Fi connection is established via the establishment of the P2P link can be short.

Figure 9:
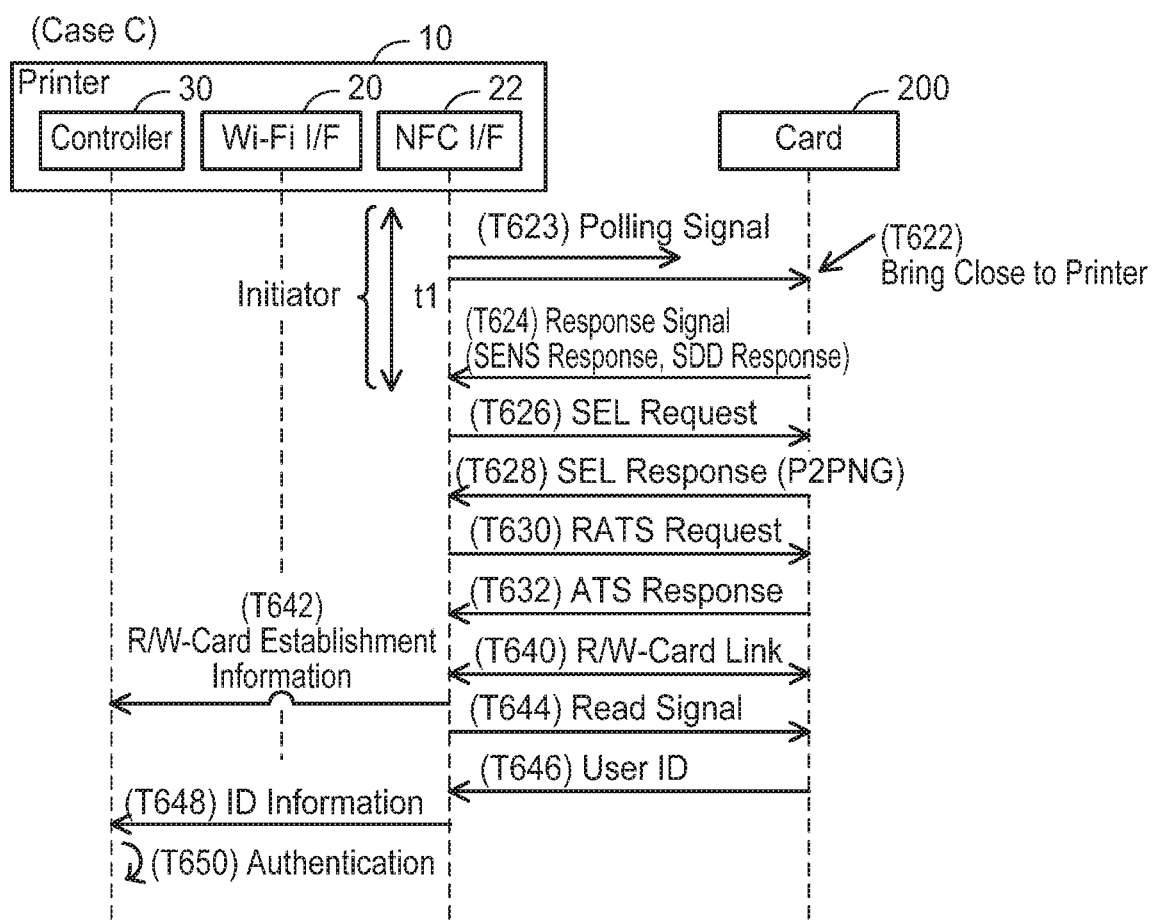
FIG. 9 shows a sequence diagram of Case C in which a R/W-Card link is established between the printer in the Initiator state and a card.

(Case C; FIG. 9)

Next, Case C in which a R/W-Card link is established between the printer 10 operating in the Initiator state and the card 200 will be described with reference to FIG. 9. Here, since the card 200 is provided with the NFC I/F being the NFC tag, it cannot operate in any of the P2P mode, the R/W mode, or the HCE mode. Due to this, a R/W-Card link for the NFC I/F 22 of the printer 10 to operate in the R/W mode is established between the printer 10 and the card 200.

T622 to T640 are similar to T222 to T240 of FIG. 4 except that the communication counterpart is the card 200. However, the SENS response included in the response signal of T624 includes the information indicating that the data size of the ID of the card 200 is 7 bytes.

Since the response signal received in T624 includes the information indicating that the data size of the ID is 7 bytes, the NFC I/F 22 of the printer 10 determines that its communication counterpart is a card, and supplies the controller 30 in T642 with R/W-Card establishment information that includes information indicating that a R/W-Card link with the communication counterpart being a card has been established. The controller 30 does not change the value of the counter 38 even when the R/W-Card establishment information is acquired. As above, the controller 30 changes the value of the counter 38 (T244 of FIG. 4, T444 of FIG. 6) for the case where the mobile terminal 100B, for which the TA time period needs to be extended, is the communication counterpart, and does not change the value of the counter 38 for the case where the card 200, for which the TA time period does not need to be extended, is the communication counterpart. Due to this, the controller 30 does not supply an IN request signal to the NFC I/F 22 in the case where the communication counterpart is a card. Thus, the controller 30 can suitably switch whether or not to supply an IN request signal depending on its communication counterpart.

The NFC I/F 22 of the printer 10 uses the R/W-Card link established in T640 to send the Read signal for reading data from the card 200 to the card 200 in T644, receives the user ID from the card 200 in T646, and supplies ID information including the user ID in T648 to the controller 30. The controller 30 authenticates the user ID in T650, and executes a process such as printing in the event where the authentication succeeds.

In a variant, a login ID for logging into the printer 10 and the user ID may be associated and stored in the memory 34 of the printer 10. In this case, when the ID information is acquired from the NFC I/F 22 in T648, the controller 30 determines whether or not the user ID in this ID information is stored in the memory 34, and allows login to the printer 10 in a case where this user ID is stored in the memory 34. Further, in another variant, the user ID and shortcut information may be associated and stored in the memory 34 of the printer 10. The shortcut information is, for example, information indicating a destination of FAX data in a case where the printer 10 is a multi-function peripheral having a FAX function. In this case, when the ID information is acquired from the NFC I/F 22, the controller 30 determines whether or not the user ID in this ID information is stored in the memory 34, and sends the FAX data to the destination included in the shortcut information associated with the user ID in a case where this user ID is stored in the memory 34.

Figure 10:
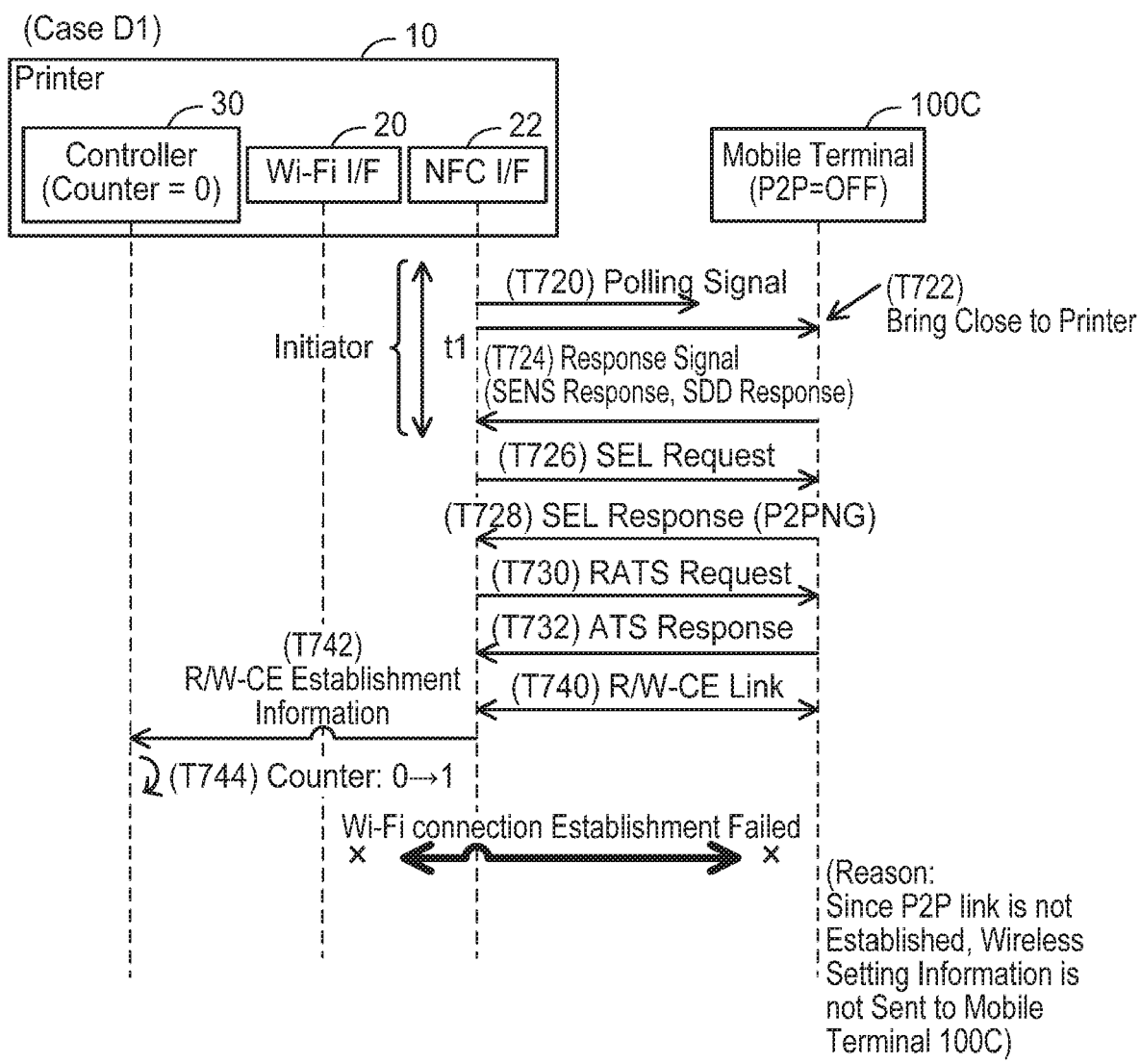
FIG. 10 shows a sequence diagram of Case D1 in which a R/W-CE link is established between the printer in the Initiator state and the mobile terminal.

(Case D1; FIG. 10)

Next, Case D1 will be described with reference to FIG. 10. In Case D1, a R/W-CE link is established between the printer 10 operating in the Initiator state and the mobile terminal 100C provided with the iOS 136c. In the initial state of FIG. 10, the P2P mode of the mobile terminal 100C is OFF, and the R/W mode and the HCE mode thereof are ON. All of processes T720 to T744 shown in Case D1 are similar to T220 to T244 of FIG. 4 except that the mobile terminal 100C is the communication counterpart.

Figure 11:
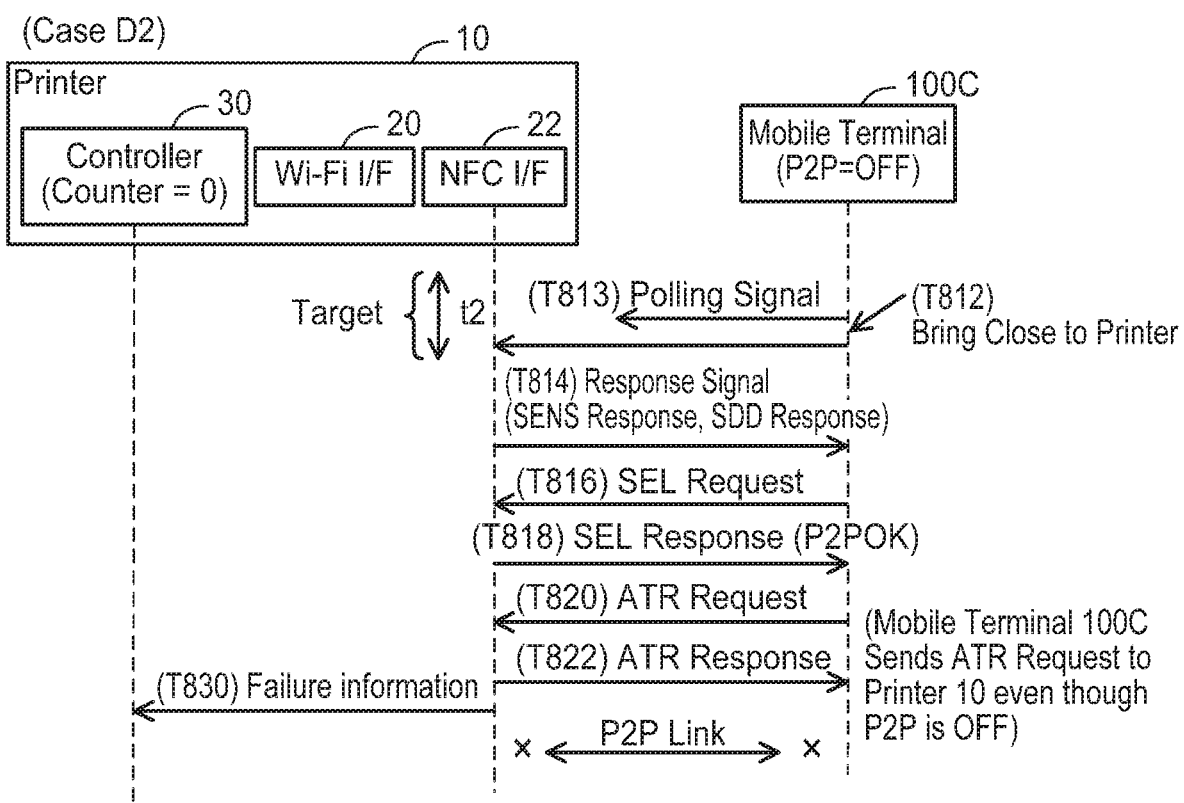
FIG. 11 shows a sequence diagram of Case D2 in which an establishment of a P2P link fails between the printer in the Target state and the mobile terminal.

(Case D2; FIG. 11)

Next, Case D2 will be described with reference to FIG. 11. In Case D2, a P2P link is not established between the printer 10 operating in the Target state and the mobile terminal 100C. The initial state of FIG. 11 is similar to the initial state of Case D1 of FIG. 10.

T812 to T818 are similar to T112 to T118 of FIG. 3 except that the mobile terminal 100C is the communication counterpart. In the case of receiving the SEL response including the information "P2POK" from the printer 10 (T818), the NFC I/F of the mobile terminal 100C sends the ATR request for requesting to establish a P2P link to the printer 10 in T820 despite its P2P mode being OFF. In T820, the NFC I/F of the mobile terminal 100C sending the ATR request is likely due to a malfunction of the mobile terminal 100C.

When the ATR request from the mobile terminal 100C is received in T820, the NFC I/F 22 of the printer 10 sends the ATR response to the mobile terminal 100C in T822. However, since the P2P mode of the NFC I/F of the mobile terminal 100C is OFF, a P2P link is not established between the NFC I/F 22 of the printer 10 and the NFC I/F of the mobile terminal 100C. Thus, the wireless setting information is not sent from the printer 10 to the mobile terminal 100C, and a Wi-Fi connection is not established between the printer 10 and the mobile terminal 100C.

In T830, the NFC I/F 22 of the printer 10 supplies failure information indicating that the P2P link was not established with the mobile terminal 100C to the controller 30.

Figure 12:
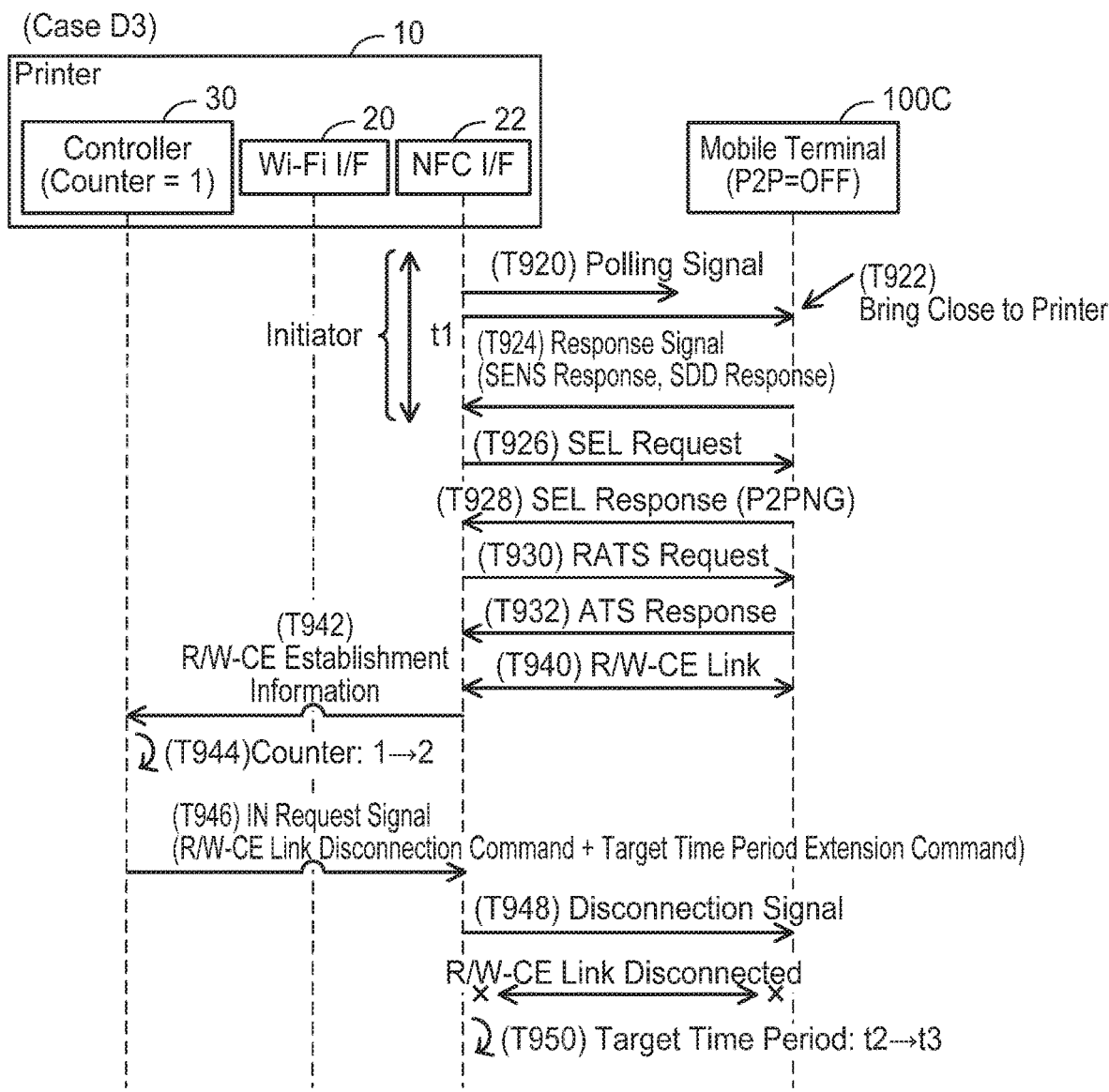
FIG. 12 shows a sequence diagram of Case D3 in which the Target time period is extended.

(Case D3; FIG. 12)

Next, Case D3, which is a continuation of Case D1, that is, Case D3 in which "1" is stored in the counter 38 will be described with reference to FIG. 12. All of processes T920 to T950 shown in Case D3 are similar to T420 to T450 of FIG. 6 except that the mobile terminal 100C is the communication counterpart. That is, when the R/W-CE establishment information is received from the NFC I/F 22 (T942), the controller 30 of the printer 10 increments the value of the counter 38 by "1" (T944). Then, when determining that the value of the counter 38 has reached "2", the controller 30 supplies the NFC I/F 22 with the IN request signal including the R/W-CE link disconnection command and the Target time period extension command (T946). As a result, the NFC I/F 22 disconnects the R/W-CE link (T948) and changes the TA time period from the time period t2 to the time period t3 (T950).

Figure 13:
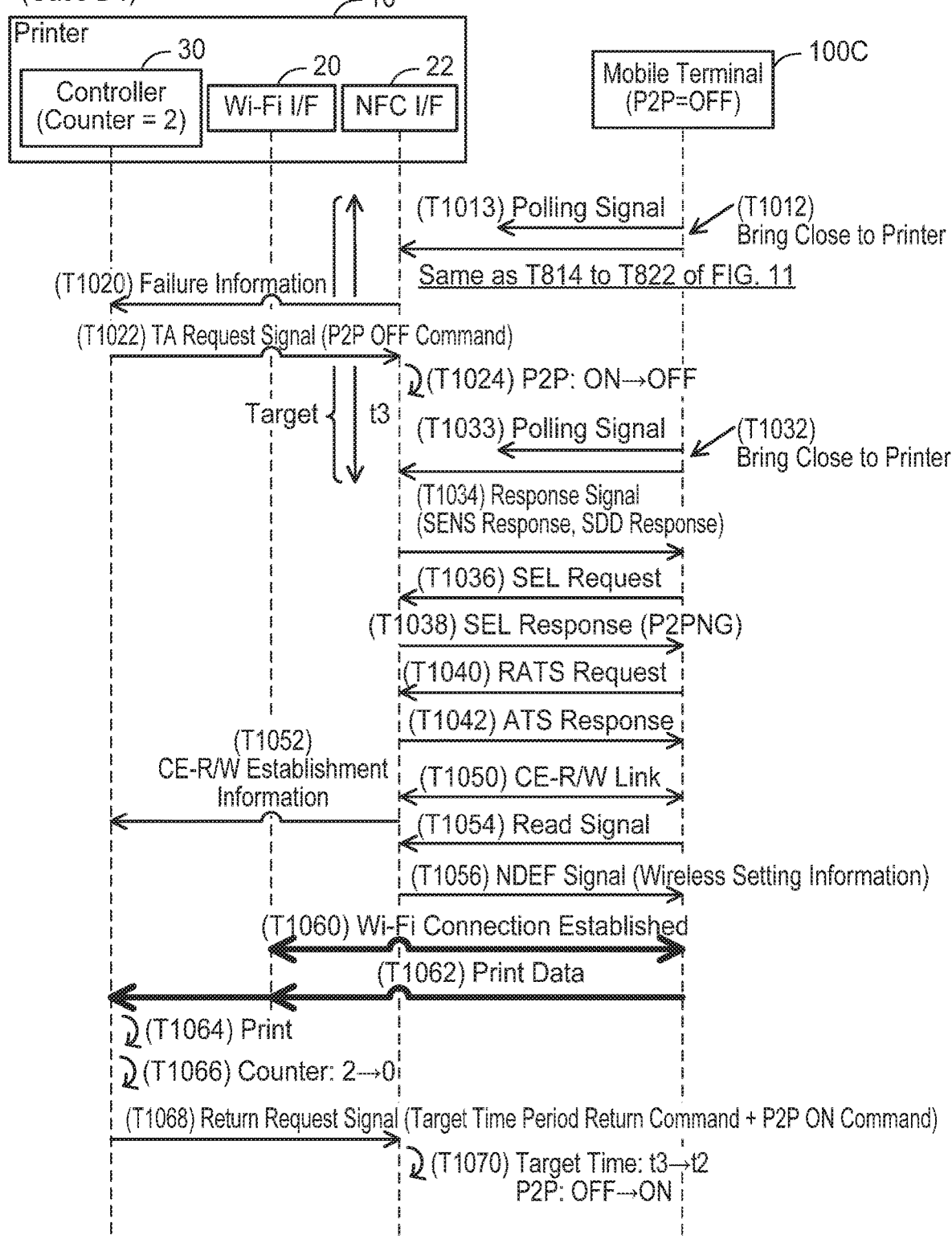
FIG. 13 shows a sequence diagram of Case D4, which is a continuation of Case D3.

(Case D4; FIG. 13)

Next, Case D4 in which a CE-R/W link is established between the printer 10 operating in the Target state and the mobile terminal 100C will be described with reference to FIG. 13. Case D4 is a state after Case D3 of FIG. 12, that is, a state after the TA time period has been changed from the time period t2 to the time period t3.

When the user brings the mobile terminal 100C close to the printer 10 in T1012, the NFC I/F 22 of the printer 10 operating in the Target state receives a polling signal from the mobile terminal 100C in T1013. After this, processes similar to T814 to T822 of FIG. 11 are executed between the printer 10 and the mobile terminal 100C. Then, the NFC I/F 22 supplies the failure information to the controller 30 in T1020.

When acquiring the failure information from the NFC I/F 22 in T1020, the controller 30 of the printer 10 determines that a predetermined condition of acquiring the failure information in a state where the value of the counter 38 is "2" is satisfied. In this case, the controller 30 supplies a TA request signal including a P2POFF command to the NFC I/F 22 in T1022. The P2POFF command is a command that requests the NFC I/F 22 to change the P2P mode in the Target state upon acquiring the TA request signal from ON to OFF. The controller 30 does not supply the TA request signal to the NFC I/F 22 even if the failure information is acquired in a state where the value of the counter 38 is less than "2".

When the NFC I/F 22 of the printer 10 acquires the TA request signal from the controller 30 in T1022, it changes the P2P mode from ON to OFF in T1024. When the user brings the mobile terminal 100C close to the printer 10 in T1032, the NFC I/F 22 of the printer 10 operating in the Target state receives a polling signal from the mobile terminal 100C in T1033.

T1034 and T1036 are similar to T814 and T816 of FIG. 11. When the NFC I/F 22 of the printer 10 receives a SEL request from the mobile terminal 100C in T1036, it sends a SEL response including the information "P2PNG" to the mobile terminal 100C in T1038, since its P2P mode is OFF (see T1024).

Since the NFC I/F of the mobile terminal 100C receives the information "P2PNG" from the printer 10 in T1038, it can acknowledge that the P2P mode of the NFC I/F 22 of the printer 10 is OFF. Due to this, the NFC I/F of the mobile terminal 100C sends a RATS request for requesting to establish a CE-R/W link instead of a P2P link to the printer 10 in T1040.

When the NFC I/F 22 of the printer 10 receives the RATS request in T1040 from the mobile terminal 100C, it sends an ATS response to the mobile terminal 100C in T1042. As a result, a CE-R/W link is established between the NFC I/F 22 of the printer 10 and the NFC I/F of the mobile terminal 100C in T1050. Then, the NFC I/F 22 supplies the controller 30 in T1052 with CE-R/W establishment information that includes information indicating that the CE-R/W link has been established with the communication counterpart being the mobile terminal.

When the NFC I/F 22 of the printer 10 receives a Read signal from the mobile terminal 100C in T1054, it sends an NDEF signal including the wireless setting information to the mobile terminal 100C in T1056. This wireless setting information is described in an NDEF area of the NDEF signal. T1060 to T1066 which follow thereafter are similar to T540 to T546 of FIG. 7.

The controller 30 of the printer 10 supplies the NFC I/F 22 in T1068 with a return request signal including the Target time period return command and a P2PON command The Target time period return command is a command that requests the NFC I/F 22 to return the TA time period from the time period t3 to the time period t2. The P2PON command is a command that requests the NFC I/F 22 to change the P2P mode from OFF to ON. When the return request signal is acquired from the controller 30 in T1068, the NFC I/F 22 changes the TA time period from the time period t3 to the time period t2 and further changes the P2P mode from OFF to ON in T1070.

As shown in Case D1 of FIG. 10 and Case D3 of FIG. 12, the printer 10 establishes a R/W-CE link with the mobile terminal 100C in the case where the NFC I/F 22 in the Initiator state executes communication of a polling signal with the mobile terminal 100C, however, it cannot send the wireless setting information to the mobile terminal 100C by using the R/W-CE link. Due to this, the printer 10 cannot establish a Wi-Fi connection with the mobile terminal 100C. Further, as shown in Case D2 of FIG. 11, the printer 10 cannot establish a P2P link with the mobile terminal 100C in the case where the NFC I/F 22 in the Target state executes communication of a polling signal with the mobile terminal 100C. In this case as well, the printer 10 cannot establish a Wi-Fi connection with the mobile terminal 100C. That is, it can be said that the CE-R/W link established by communication of polling signals between the printer 10 operating in the Target state and the mobile terminal 100C is an NFC link suitable for establishing a Wi-Fi connection between the printer 10 and the mobile terminal 100C.

(Effects of Cases D1 to D4)

Figure 14:
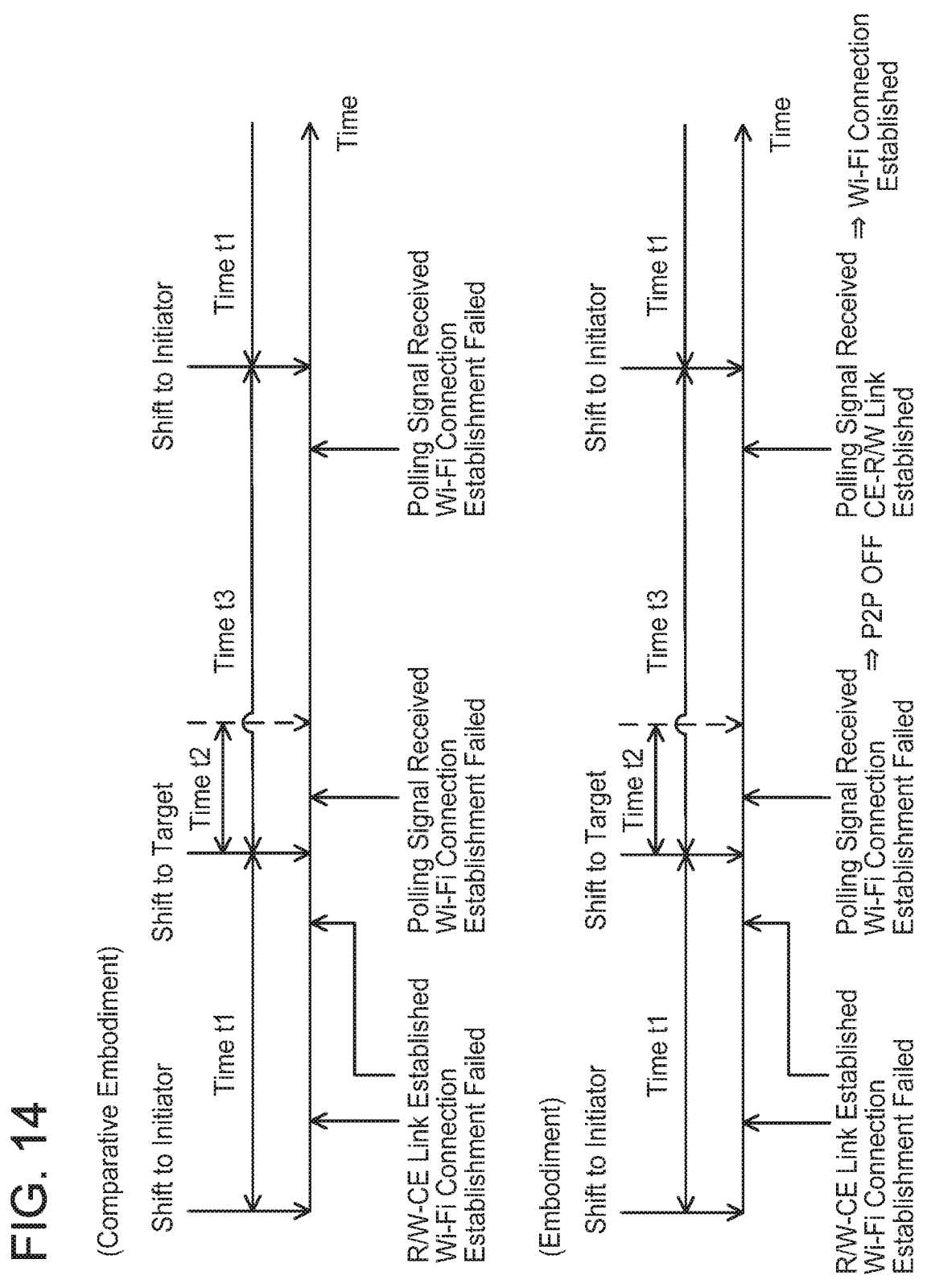

Effects of Cases D1 to D4 of the present embodiment will be described with reference to FIG. 14. Firstly, an operation of a printer of a comparative embodiment will be described. The printer of the comparative embodiment is provided with a similar configuration to that of the printer 10 except that it does not change the P2P mode from ON to OFF. That is, in a case of sending a polling signal to the mobile terminal 100C while operating in the Initiator state, the printer cannot establish a P2P link with the mobile terminal 100C, and thus establishes a R/W-CE link with the mobile terminal 100C and changes a value of a counter from "0" to "1". After this, the printer cannot establish a P2P link with the mobile terminal 100C even if a polling signal is sent again to the mobile terminal 100C, thus establishes a R/W-CE link with the mobile terminal 100C and changes the value of the counter from "1" to "2". In this case, the printer changes the TA time period from the time period t2 to the time period t3. Then, when the time period t1 elapses, the printer shifts to the Target state that uses the time period t3 as the TA time period. After this, in a case where the printer receives a polling signal from the mobile terminal 100C while operating in the Target state, the printer cannot establish a P2P link nor a CE-R/W link with the mobile terminal 100C due to the mobile terminal 100C sending an ATR request to the printer despite having its P2P mode set to OFF. Further, even when a polling signal is received again from the mobile terminal 100C before the time period t3 elapses, the printer cannot establish a P2P link nor a CE-R/W link with the mobile terminal 100C due to the mobile terminal 100C sending the ATR request to the printer despite having its P2P mode set to OFF.

As above, the printer of the comparative embodiment can increase the likelihood of receiving a polling signal from the mobile terminal 100C since it uses the time period t3 as the TA time period. However, the printer cannot establish a P2P link nor a CE-R/W link with the mobile terminal 100C due to the mobile terminal 100C sending the ATR request to the printer despite having its P2P mode set to OFF. Due to this, the printer cannot send wireless setting information to the mobile terminal 100C, and thus cannot establish a Wi-Fi connection with the mobile terminal 100C.

Next, an operation of the printer 10 of the embodiment will be described. In the case where the printer 10 sends a polling signal to the mobile terminal 100C while operating in the Initiator state (T720 of FIG. 10), it cannot establish a P2P link with the mobile terminal 100C, thus establishes a R/W-CE link with the mobile terminal 100C (T740), and changes the value of the counter 38 from "0" to "1" (T744). Then, when the printer 10 sends a polling signal again to the mobile terminal 100C while operating in the Initiator state (T920 of FIG. 12), it establishes a R/W-CE link with the mobile terminal 100C (T940), changes the value of the counter 38 from "1" to "2" (T944), and changes the TA time period from the time period t2 to the time period t3 (T950).

After this, when the time period t1 elapses, the printer 10 shifts to the Target state that uses the time period t3 as the TA time period. In the case of receiving a polling signal from the mobile terminal 100C while operating in the Target state (T1013 of FIG. 13), the printer 10 cannot establish a P2P link nor a CE-R/W link with the mobile terminal 100C due to the mobile terminal 100C sending an ATR request to the printer 10 despite having its P2P mode set to OFF. In this case, the printer 10 changes its P2P mode from ON to OFF (T1024). After this, when the printer 10 receives a polling signal from the mobile terminal 100C again (T1033), it sends a SEL response including the information "P2PNG" to the mobile terminal 100C (T1038) since its P2P mode is OFF (see T1024). Due to this, the printer 10 receives a RATS request from the mobile terminal 100C (T1040) and thus can establish a CE-R/W link with the mobile terminal 100C (T1050). As a result, the printer 10 sends the wireless setting information to the mobile terminal 100C (T1056) and thus can establish a Wi-Fi connection with the mobile terminal 100C (T1060).

As above, the printer 10 of the present embodiment changes the TA time period from the time period t2 to the time period t3 when the value of the counter 38 reaches the threshold "2" while the printer 10 is operating in the Initiator state. Further, the printer 10 sets the P2P mode to OFF in the case where a polling signal is received from the mobile terminal 100C in the state where the value of the counter 38 is "2", and establishment of a P2P link with the mobile terminal 100C fails. Due to this, the likelihood of receiving a polling signal from the mobile terminal 100C can be increased due to the extended time period of operating in the Target state. Further, by setting the P2P mode to OFF, a CE-R/W link being the suitable NFC link (that is, an NFC link through which the wireless setting information can be sent) can be established with the mobile terminal 100C. As a result, the printer 10 can suitably establish a Wi-Fi connection with the mobile terminal 100C.

(Corresponding Relationships)

The printer 10, the NFC I/F 22, and the memory 24 are respectively examples of a "communication device", a "wireless interface", and an "interface memory". The Initiator state and the Target state are respectively examples of a "first state" and a "second state". The time period t1 of the IN time period, the time period t2 of the TA time period, and the time period t3 of the TA time period are respectively examples of a "first predetermined time period", a "second predetermined time period", and a "specific time period". The polling signals sent from the printer 10 and the polling signals sent from the mobile terminals 100A to 100C are respectively examples of a "first polling signal" and a "second polling signal". The IN request signal is an example of a "specific signal". The R/W-CE establishment information, the P2P establishment information, and the R/W-Card establishment information are respectively examples of "first information", "second information", and "third information". The wireless setting information is an example of "target data".

In one aspect, the mobile terminal 100B and the mobile terminal 100A are respectively examples of a "first external device" and a "second external device". The R/W-CE link and the R/W-Card link are respectively examples of a "first wireless link" and a "fifth wireless link". The P2P link is an example of a "third wireless link" and a "fourth wireless link". The return request signal is an example of a "return signal". The user ID is an example of "specific data". T442 of FIG. 6 and T446 of FIG. 6 are respectively examples of a process to "acquire first information from the wireless interface" and a process to "supply a specific signal to the wireless interface".

In another aspect, the mobile terminal 100C and the mobile terminal 100A are respectively examples of the "first external device" and the "second external device". The R/W-CE link, the CE-R/W link, and the R/W-Card link are respectively examples of the "first wireless link", a "second wireless link", and the "fifth wireless link". The P2P link is an example of the "third wireless link" and the "fourth wireless link". The return request signal and the TA request signal are respectively examples of the "return signal" and a "disablement signal". The user ID is an example of the "specific data". T942 of FIG. 12 and T946 of FIG. 12 are respectively examples of the process to "acquire first information from the wireless interface" and the process to "supply a specific signal to the wireless interface".

Second Embodiment

In the present embodiment, commands included in the IN request signal is different from those of the first embodiment (see T446 of FIG. 6).

Figure 15:
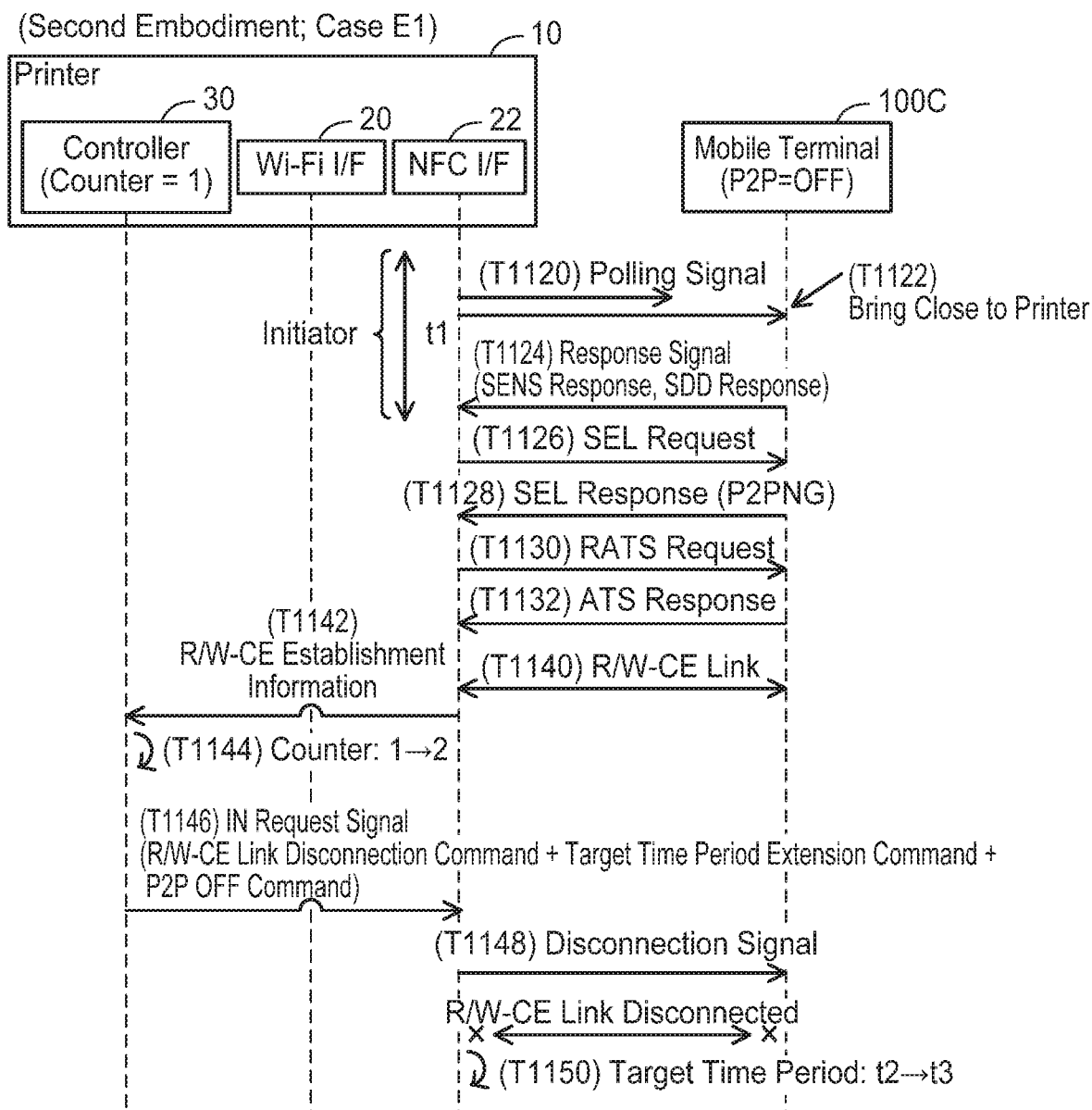
FIG. 15 shows a sequence diagram of Case E1 in a second embodiment, in which a Target time period extension and a P2P mode disablement are requested.

(Case E1; FIG. 15)

Case E1 in which a R/W-CE link is established between the printer 10 operating in the Initiator state and the mobile terminal 100C provided with the iOS 136c will be described with reference to FIG. 15. An initial state of Case E1 is a state in which there is a history of a R/W-CE link having been established between the printer 10 and the terminal device 100C before, that is, a state where "1" is stored in the counter 38.

T1120 to T1144 are similar to T920 to T944 of FIG. 12. When the value of the counter 38 reaches "2", the controller 30 of the printer 10 supplies the NFC I/F 22 with an IN request signal including the R/W-CE link disconnection command, the Target time period extension command, and P2POFF command in T1146. The P2POFF command in the second embodiment is a command that requests the NFC I/F 22 to change the P2P mode from ON to OFF in the Target state immediately after the acquisition of the IN request signal. T1148 and T1150 are respectively similar to T948 and T950.

Figure 16:
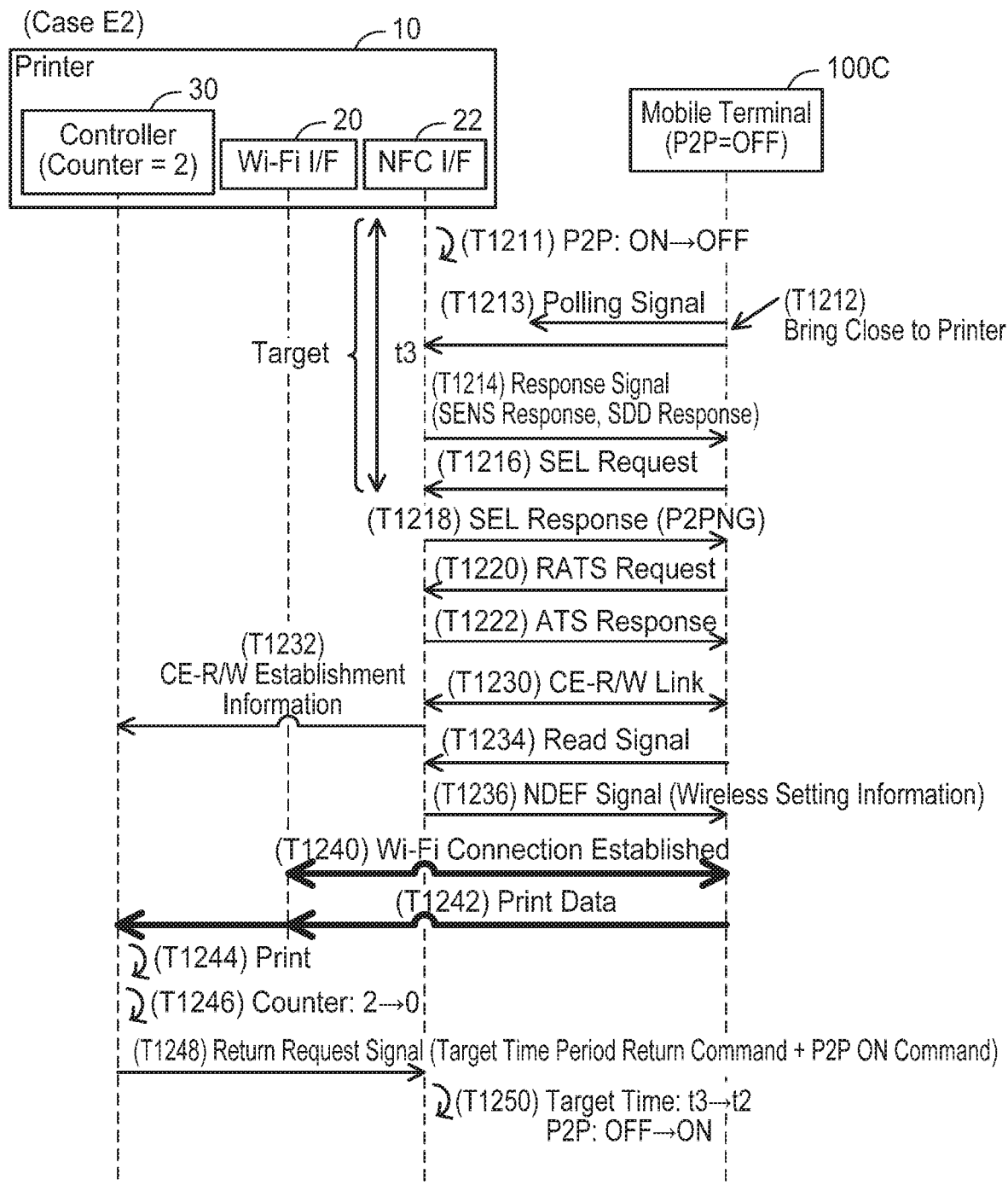
FIG. 16 shows a sequence diagram of Case E2, which is a continuation of Case E1.

(Case E2; FIG. 16)

Next, Case E2 in which a CE-R/W link is established between the printer 10 operating in the Target state and the mobile terminal 100C will be described with reference to FIG. 16. An initial state of Case E2 is similar to the initial state of Case D3 of FIG. 12.

When the NFC I/F 22 of the printer 10 shifts from the Initiator state to the Target state, it changes the P2P mode from ON to OFF in T1211 since it acquired the P2POFF command in T1146 of FIG. 15. T1212 to T1250 taking place thereafter are similar to T932 to T970 of FIG. 12. That is, a CE-R/W link is established between the NFC I/F 22 and the mobile terminal 100C (T1230), and the NFC I/F 22 sends an NDEF signal including the wireless setting information to the mobile terminal 100C by using the CE-R/W link (T1236). As a result, a Wi-Fi connection is established between the printer 10 and the mobile terminal 100C (T1240).

In FIGS. 15 and 16, the cases where the communication counterpart of the printer 10 is the mobile terminal 100C were exemplified, however, similar processes are executed in cases where the communication counterpart is the mobile terminal 100B. That is, when the value of the counter 38 reaches "2", the controller 30 of the printer 10 supplies the NFC I/F 22 with an IN request signal including the R/W-CE link disconnection command, the Target time period extension command, and the P2POFF command (see T1146 of FIG. 15). In this case, when receiving a polling signal from the mobile terminal 100B while operating in the Target state, the printer 10 establishes a CE-R/W link with the mobile terminal 100B. As a result, a Wi-Fi connection is established between the printer 10 and the mobile terminal 100B.

(Effects of Cases E1, E2)

Effects of Cases E1 and E2 of the present embodiment will be described with reference to FIG. 17. A printer of a comparative embodiment is similar to the printer of the comparative embodiment of FIG. 14. Thus, since the printer of the comparative embodiment uses the time period t3 as the TA time period, the likelihood of receiving a polling signal from the mobile terminal 100C can be increased. However, the printer cannot establish a P2P link nor a CE-R/W link with the mobile terminal 100C due to the mobile terminal 100C sending the ATR request to the printer despite having its P2P mode set to OFF. Due to this, the printer cannot send wireless setting information to the mobile terminal 100C, and thus cannot establish a Wi-Fi connection with the mobile terminal 100C.

Next, an operation of the printer 10 of the present embodiment will be described. When the printer 10 sends a polling signal to the mobile terminal 100C while operating in the Initiator state, it cannot establish a P2P link with the mobile terminal 100C, thus establishes a R/W-CE link with the mobile terminal 100C, and changes the value of the counter 38 from "0" to "1". Then, when the printer 10 sends a polling signal again to the mobile terminal 100C while operating in the Initiator state, it establishes a R/W-CE link with the mobile terminal 100C (T1140 of FIG. 15), changes the value of the counter 38 from "1" to "2" (T1144), and changes the TA time period from the time period t2 to the time period t3 (T1150).

After this, when the time period t1 elapses, the printer 10 shifts to the Target state that uses the time period t3 as the TA time period and changes the P2P mode from ON to OFF (T1211 of FIG. 16). When the printer 10 receives a polling signal from the mobile terminal 100C while operating in the Target state (T1213), it sends a SEL response including the information "P2PNG" to the mobile terminal 100C (T1218) since its P2P mode is OFF (see T1211). Due to this, the printer 10 receives a RATS request from the mobile terminal 100C (T1220) and thus can establish a CE-R/W link with the mobile terminal 100C (T1230). As a result, the printer 10 sends the wireless setting information to the mobile terminal 100C (T1236) and thus can establish a Wi-Fi connection with the mobile terminal 100C (T1240).

As above, the printer 10 of the present embodiment changes the TA time period from the time period t2 to the time period t3 when it determines that the value of the counter 38 has reached the threshold "2" while operating in the Initiator state. Further, the printer 10 sets the P2P mode to OFF upon shifting to the Target state. Due to this, the time period of operating in the Target state is extended, so the likelihood of receiving a polling signal from the mobile terminal 100C can be increased. Further, since the P2P mode is set to OFF, a CE-R/W link, which is a suitable NFC link (that is, an NFC link through which the wireless setting information can be sent) can be established with the mobile terminal 100C at an early stage. As a result, the printer 10 can suitably establish a Wi-Fi connection with the mobile terminal 100C.

(Corresponding Relationships)

The mobile terminal 100C and the mobile terminal 100A are respectively examples of the "first external device" and the "second external device". The IN request signal in T1146 of FIG. 15 is an example of the "specific signal". T1142 of FIG. 15 and T1146 of FIG. 15 are respectively examples of the process to "acquire first information from the wireless interface" and the process to "supply a specific signal to the wireless interface".

(Variant 1) The "wireless interface" may be an interface configured to execute a wireless communication using a Bluetooth (registered trademark) scheme. In this case, the "first polling signal" and the "second polling signal" are signals for establishing a wireless link under the Bluetooth scheme.

(Variant 2) The Target time period extension command in T446 of FIG. 6 may be a command that requests to change the TA time period from the time period t2 to the time period t3 and to change the IN time period from the time period t1 to a time period t4 which is different from the time period t1. Further, in another variant, the Target time period extension command may not be a command that requests to change the TA time period from the time period t2 to the time period t3 in the Target state immediately after the acquisition of the IN request signal, and may be a command that requests to change the TA time period from the time period t2 to the time period t3 in the Target state which takes place after the aforementioned Target state.

(Variant 3) The P2POFF command in T1022 of FIG. 13 may not be a command that requests to change the P2P mode from ON to OFF in the Target state upon acquiring the TA request signal, and may be a command which requests to change the P2P mode from ON to OFF in the Target state which takes place after the aforementioned Target state. Further, in another variant, the P2POFF command may not be a command which requests to change the P2P mode from ON to OFF only in the Target state, and may be a command which requests to change the P2P mode from ON to OFF in both the Target state and the Initiator state.

(Variant 4) The IN request signal in T1146 of FIG. 15 may be a signal that does not include the Target time period extension command but includes the P2POFF command In this case, the NFC I/F 22 may change the P2P mode from ON to OFF without changing the TA time period.

(Variant 5) The NFC I/F 22 of the printer 10 may set the HCE mode to OFF in the Target state. Further, the NFC I/F 22 may change the P2P mode from ON to OFF and further change the HCE mode from OFF to ON in the case of acquiring the TA request signal from the controller 30 in T1022 of FIG. 13. To describe in general terms, the "wireless interface" may not enable the HCE mode in the second state before acquiring the specific signal from the controller.

(Variant 6-1) The NFC I/F 22 of the printer 10 may set the P2P mode to ON in the Initiator state and the P2P mode to OFF in the Target state. In this variant, a CE-R/W link is established instead of the P2P link between the printer 10 and the mobile terminal 100B in FIGS. 5 and 7. Further, in this variant, a case will be described in which the P2POFF command in FIG. 13 is the command which requests to change the P2P mode from ON to OFF in both the Target state and the Initiator state. In this case, the NFC I/F 22 may operate in the Initiator state in which the P2P mode is OFF and the R/W mode is ON after having acquired the TA request signal from the controller 30.

(Variant 6-2) The NFC I/F 22 of the printer 10 may set the P2P mode to OFF in the Initiator state and the P2P mode to ON in the Target state. In this variant, similarly to Case D4 of FIG. 13, the NFC I/F 22 changes the P2P mode from ON to OFF in the case of acquiring the TA request signal including the P2P OFF command from the mobile terminal 100C. Due to this, the NFC I/F 22 operates in the Target state in which the P2P mode is OFF and the HCE mode is ON.

(Variant 7) The controller 30 of the printer 10 may not supply the Target time period return command to the NFC I/F 22 in T548 of FIG. 7, in T1068 of FIG. 13, and in T1248 of FIG. 16. In this variant, the NFC I/F 22 may change the TA time period from the time period t3 to the time period t2 in a case where a power of the printer 10 is turned ON after having been turned OFF, in a case where an operation for changing the TA time period from the time period t3 to the time period t2 is performed on the operation unit 12 by the user, and the like.

(Variant 8) The controller 30 of the printer 10 may not supply the P2PON command to the NFC I/F 22 in T1068 of FIG. 13 and T1248 of FIG. 16. In this variant, the NFC I/F 22 may change the P2P mode from OFF to ON in a case where the power of the printer 10 is turned ON after having been turned OFF by the user, in a case where an operation to set the P2P mode to ON is performed on the operation unit 12 by the user, and the like.

(Variant 9) When the P2P link is established in T530 of FIG. 7, the NFC I/F 22 of the printer 10 may shift from the Target state to the Initiator state even before the TA time period exceeds the time period t3. Further, in another variant, the NFC I/F 22 of the printer 10 may continue to operate in the Target state until a P2P link is established with its communication counterpart in the case of shifting to the Target state after having acquired the IN request signal including the Target time period extension command from the controller 30 in T446 of FIG. 6. That is, the NFC I/F 22 stops the shifting from the Target state to the Initiator state until the P2P link is established with its communication counterpart. In this variant, in a case where a time period of the Target state, which is to continue until the P2P link is established, becomes longer than the time period t2, this time period is an example of the "specific time period".

(Variant 10) The data which the printer 10 sends to its communication counterpart by using the P2P link and the like established in T530 of FIG. 7 may not be limited to the wireless setting information, and may be a URL (abbreviation of Uniform Resource Locator) of a webpage indicating a content of an error occurring in the printer 10, or may be a URL of a webpage indicating the content of the error and how to resolve it.

(Variant 11) The NFC I/F 22 may be capable of operating in the CE mode, which does not require a secure element, instead of in the HCE mode which requires a secure element.

(Variant 12) The NFC I/F 22 of the printer 10 may not supply the controller 30 with the establishment information indicating that an NFC link has been established with its communication counterpart after establishment of the NFC link. In this variant, the controller 30 determines whether the communication counterpart is a mobile terminal or not, and whether a P2P link with the communication counterpart is established or not. In this variant, when receiving a response signal to a polling signal from the communication counterpart while operating in the Initiator state (T24 of FIG. 2), the NFC I/F 22 supplies the controller 30 with a signal including data size information related to a data size of the ID of the communication counterpart included in the response signal. Further, when receiving a SEL response from the communication counterpart (T28), the NFC I/F 22 supplies the controller 30 with a signal including P2P information related to the P2P mode of the communication counterpart included in the SEL response. Specifically, in a case where the SEL response includes the information "P2POK", the NFC I/F 22 supplies the controller 30 with P2P information that includes ON information indicating that the P2P mode of the communication counterpart is ON, and in a case where the SEL response includes the information "P2PNG", it supplies the controller 30 with P2P information that includes OFF information indicating that the P2P mode of the communication counterpart is OFF. Further, the controller 30 determines that the communication counterpart is a mobile terminal in a case where the data size information is 4 bytes, and determines that the communication counterpart is a card in a case where the data size information is 7 bytes. The controller 30 determines that a R/W-CE link with the communication counterpart is established in a case where the communication counterpart is a mobile terminal (such as the mobile terminals 100B, 100C) and the P2P information includes the OFF information. Further, the controller 30 determines that a P2P link with the communication counterpart is established in a case where the communication counterpart is a mobile terminal (such as the mobile terminal 100A) and the P2P information includes the ON information. Further, the controller 30 determines that a R/W-Card link with the communication counterpart is established in a case where the communication counterpart is a card. In this variant, the data size information indicating 4 bytes and the OFF information are examples of the "first information". Further, the data size information indicating 4 bytes and the ON information are examples of the "second information". Further, the data size information indicating 7 bytes is an example of the "third information".

(Variant 13) The "communication device" is not limited to the printer 10, and may be a scanner, a multi-function peripheral, a PC, a server, a smartphone, and the like.

(Variant 14) In the above embodiments, the respective processes executed by the controller 30 are implemented by software (that is, the program 36), however, at least one of these processes may be implemented by hardware such as a logic circuit.

What is claimed is:

1. A communication device comprising:
a wireless interface configured to repeat operating sequentially in a plurality of states including a first state and a second state, the first state being a state where the wireless interface sends a first polling signal over a first predetermined time period, the first polling signal being for establishing a wireless link with an external device, the second state being a state where the wireless interface waits to receive a second polling signal over a second predetermined time period, the second polling signal being for establishing a wireless link with the communication device and being sent from an external device;
a processor; and
a memory storing computer-readable instructions therein, the computer-readable instructions, when executed by the processor, causing the communication device to:
acquire first information from the wireless interface in a case where the wireless interface operating in the first state sends the first polling signal to a first external device and receives a response signal to the first polling signal from the first external device; and
supply a specific signal to the wireless interface in a case where the first information is acquired from the wireless interface, the specific signal being for causing the wireless interface to use, as a duration time period of the second state, a specific time period instead of the second predetermined time period, the specific time period being longer than the second predetermined time period.

2. The communication device as in claim 1, wherein
the wireless interface operating in the first state is configured to supply the first information to the processor in a case where a first wireless link is established with the first external device in response to sending the first polling signal to the first external device and receiving the response signal from the first external device, the first information indicating that the first wireless link is established,
the specific signal is for further causing the wireless interface to disconnect the first wireless link with the first external device, and
the wireless interface is configured to disconnect the first wireless link with the first external device in response to the specific signal being supplied from the processor.

3. The communication device as in claim 2, wherein
the wireless interface is configured to execute a wireless communication according to a Near Field Communication (NFC) scheme, and
the first wireless link is for the communication device to operate in a Reader/Writer (R/W) mode of the NFC scheme.

4. The communication device as in claim 3, wherein
the wireless interface operating in the second state is configured to send target data to the first external device in a case where a second wireless link is established with the first external device in response to receiving the second polling signal from the first external device, the second wireless link being for the communication device to operate in a Card Emulation (CE) mode of the NFC scheme.

5. The communication device as in claim 4, wherein
the computer-readable instructions, when executed by the processor, further cause the communication device to:
acquire failure information from the wireless interface in a case where the wireless interface operating in the second state fails to establish a third wireless link with the first external device in response to receiving the second polling signal from the first external device, the third wireless link being for the communication device to operate in a Peer to Peer (P2P) mode of the NFC scheme, and
supply a disablement signal to the wireless interface in a case where the failure information is acquired from the wireless interface, the disablement signal being for causing the wireless interface to achieve a state where the P2P mode is disabled and the CE mode is enabled in the second state.

6. The communication device as in claim 4, wherein
the wireless interface comprises an interface memory, and
the computer-readable instructions, when executed by the processor, further cause the communication device to:
cause the wireless interface to store the target data in the interface memory before the second wireless link is established with the first external device, and
the wireless interface is configured to send the target data stored in the interface memory to the first external device in a case where the second wireless link is established with the first external device.

7. The communication device as in claim 4, wherein
the computer-readable instructions, when executed by the processor, further cause the communication device to:
supply a return signal to the wireless interface after the target data has been sent to the first external device, the return signal being for causing the wireless interface to use, as the duration time period of the second state, the second predetermined time period instead of the specific time period.

8. The communication device as in claim 3, wherein
the wireless interface operating in the second state is configured to send target data to the first external device in a case where a third wireless link is established with the first external device in response to receiving the second polling signal from the first external device, the third wireless link being for the communication device to operate in a Peer to Peer (P2P) mode of the NFC scheme.

9. The communication device as in claim 1, wherein
the wireless interface is configured to execute a wireless communication according to a Near Field Communication (NFC) scheme,
the specific signal is for further causing the wireless interface to achieve a state where a Peer to Peer (P2P) mode of the NFC scheme is disabled and a Card Emulation (CE) mode of the NFC scheme is enabled in the second state, and
the wireless interface operating in the second state is configured to send target data to the first external device in a case where a second wireless link is established with the first external device in response to receiving the second polling signal from the first external device, the second wireless link being for the communication device to operate in the CE mode of the NFC scheme.

10. The communication device as in claim 9, wherein the wireless interface comprises an interface memory, and the computer-readable instructions, when executed by the processor, further cause the communication device to:
cause the wireless interface to store the target data in the interface memory before the second wireless link is established with the first external device, and
the wireless interface is configured to send the target data stored in the interface memory to the first external device in a case where the second wireless link is established with the first external device.

11. The communication device as in claim 9, wherein the computer-readable instructions, when executed by the processor, further cause the communication device to:
supply a return signal to the wireless interface after the target data has been sent to the first external device, the return signal being for causing the wireless interface to use, as the duration time period of the second state, the second predetermined time period instead of the specific time period.

12. The communication device as in claim 1, wherein the specific signal is supplied to the wireless interface in a case where the first information is acquired from the wireless interface a plurality of times.

13. The communication device as in claim 1, wherein the computer-readable instructions, when executed by the processor, further cause the communication device to:
acquire second information different from the first information from the wireless interface in a case where the wireless interface sends the first polling signal to a second external device different from the first external device and receives a response signal to the first polling signal from the second external device,
wherein the specific signal is not supplied to the wireless interface in a case where the second information is acquired from the wireless interface.

14. The communication device as in claim 13, wherein the wireless interface is configured to execute a wireless communication according to a Near Field Communication (NFC) scheme,
the wireless interface sends target data to the second external device in a case where a fourth wireless link is established with the second external device in response to sending the first polling signal to the second external device and receiving the response signal from the second external device, the fourth wireless link being for the communication device to operate in a Peer to Peer (P2P) mode of the NFC scheme.

15. The communication device as in claim 1, wherein the computer-readable instructions, when executed by the processor, further cause the communication device to:
acquire third information different from the first information from the wireless interface in a case where the wireless interface sends the first polling signal to a card and receives a response signal to the first polling signal from the card, and
the specific signal is not supplied to the wireless interface in a case where the third information is acquired from the wireless interface enabled.

16. The communication device as in claim 15, wherein the wireless interface is configured to execute a wireless communication according to a Near Field Communication (NFC) scheme, and
the wireless interface receives specific data from the card in a case where a fifth wireless link is established with the card in response to sending the first polling signal to the card and receiving the response signal from the card, the fifth wireless link being for the communication device to operate in a Reader/Writer (R/W) mode of the NFC scheme.

17. A communication device comprising:
a wireless interface configured to execute a wireless communication according to a Near Field Communication (NFC) scheme;
a processor; and
a memory storing computer-readable instructions therein, the computer-readable instructions, when executed by the processor, causing the communication device to:
acquire first information from the wireless interface in a case where the wireless interface sends a first polling signal for establishing a wireless link with an external device to a first external device and receives a response signal to the first polling signal from the first external device under a state where at least a Peer to Peer (P2P) mode of the NFC scheme is enabled;
supply a specific signal to the wireless interface in a case where the first information is acquired from the wireless interface in which at least the P2P mode is enabled, the specific signal being for causing the wireless interface to achieve a state where the P2P mode is disabled and at least one mode of a Card Emulation (CE) mode and a Reader/Writer (R/W) mode of the NFC scheme is enabled; and
acquire second information different from the first information from the wireless interface in a case where the wireless interface sends the first polling signal to a second external device different from the first external device and receives a response signal to the first polling signal from the second external device,
wherein the specific signal is not supplied to the wireless interface in a case where the second information is acquired from the wireless interface.

18. The communication device as in claim 17, wherein the wireless interface is configured to repeat operating sequentially in a plurality of states including a first state and a second state,
the first state is a state where the wireless interface sends the first polling signal over a first predetermined time period,
the second state is a state where the wireless interface waits for receiving a second polling signal over a second predetermined time period, the second polling signal being for establishing a wireless link with the communication device and being sent from an external device,
the first information is acquired from the wireless interface in a case where the wireless interface sends the first polling signal to the first external device and receives the response signal to the first polling signal from the first external device in the first state where at least the P2P mode of the NFC scheme is enabled, and
the specific signal is for causing the wireless interface to achieve a state where the P2P mode is disabled and the CE mode is enabled in the second state.

19. The communication device as in claim 18, wherein the computer-readable instructions, when executed by the processor, further cause the communication device to:
acquire failure information from the wireless interface in a case where the wireless interface operating in the second state fails to establish a third wireless link with the first external device in response to receiving the second polling signal from the first external device, the third wireless link being for the communication device to operate in the P2P mode of the NFC scheme, and the specific signal is supplied to the wireless interface in a case where the failure information is acquired from the wireless interface after the first information has been acquired from the wireless interface.

20. The communication device as in claim 17, wherein the wireless interface is in a state where the CE mode is enabled before acquiring the specific signal from the processor, and maintains the state where the CE mode is enabled in the case where the specific signal is acquired from the processor.

21. The communication device as in claim 17, wherein the specific signal is supplied to the wireless interface in a case where the first information is acquired from the wireless interface a plurality of times.

22. The communication device as in claim 17, wherein the wireless interface is configured to execute a wireless communication according to a Near Field Communication (NFC) scheme, and the wireless interface sends target data to the second external device in a case where a fourth wireless link is established with the second external device in response to sending the first polling signal to the second external device and receiving the response signal from the second external device, the fourth wireless link being for the communication device to operate in a Peer to Peer (P2P) mode of the NFC scheme.

23. A communication device comprising:
a wireless interface configured to execute a wireless communication according to a Near Field Communication (NFC) scheme;
a processor; and
a memory storing computer-readable instructions therein, the computer-readable instructions, when executed by the processor, causing the communication device to:
acquire first information from the wireless interface in a case where the wireless interface sends a first polling signal for establishing a wireless link with an external device to a first external device and receives a response signal to the first polling signal from the first external device under a state where at least a Peer to Peer (P2P) mode of the NFC scheme is enabled;

supply a specific signal to the wireless interface in a case where the first information is acquired from the wireless interface in which at least the P2P mode is enabled, the specific signal being for causing the wireless interface to achieve a state where the P2P mode is disabled and at least one mode of a Card Emulation (CE) mode and a Reader/Writer (R/W) mode of the NFC scheme is enabled; and acquire third information different from the first information from the wireless interface in a case where the wireless interface sends the first polling signal to a card and receives a response signal to the first polling signal from the card, wherein the specific signal is not supplied to the wireless interface in a case where the third information is acquired from the wireless interface.

24. The communication device as in claim 23, wherein the wireless interface is in a state where the CE mode is enabled before acquiring the specific signal from the processor, and maintains the state where the CE mode is enabled in the case where the specific signal is acquired from the processor.

25. The communication device as in claim 23, wherein the specific signal is supplied to the wireless interface in a case where the first information is acquired from the wireless interface a plurality of times.

26. The communication device as in claim 23, wherein the wireless interface is configured to execute a wireless communication according to a Near Field Communication (NFC) scheme, and the wireless interface receives specific data from the card in a case where a fifth wireless link is established with the card in response to sending the first polling signal to the card and receiving the response signal from the card, the fifth wireless link being for the communication device to operate in a Reader/Writer (R/W) mode of the NFC scheme.

* * * * *